United States Patent
Goossen et al.

(10) Patent No.: US 6,226,017 B1
(45) Date of Patent: May 1, 2001

(54) METHODS AND APPARATUS FOR IMPROVING READ/MODIFY/WRITE OPERATIONS

(75) Inventors: J. Andrew Goossen, Issaquah; Andrew C. Godfrey, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/364,363

(22) Filed: Jul. 30, 1999

(51) Int. Cl.[7] .................................................. G06F 13/16
(52) U.S. Cl. ......................... 345/521; 345/523; 711/155
(58) Field of Search ................................. 345/507–509, 345/521, 523, 524, 431, 515, 516; 711/100, 154, 155

(56) References Cited

U.S. PATENT DOCUMENTS

| | | | |
|---|---|---|---|
| 4,136,359 | 1/1979 | Wozniak | 358/17 |
| 4,217,604 | 8/1980 | Wozniak | 358/16 |
| 4,278,972 | 7/1981 | Wozniak | 340/703 |
| 5,057,739 | 10/1991 | Shimada et al. | 313/477 R |
| 5,122,783 | 6/1992 | Bassetti, Jr. | 340/701 |
| 5,254,982 | 10/1993 | Feigenblatt et al. | 345/148 |
| 5,298,915 | 3/1994 | Bassetti, Jr. et al. | 345/149 |
| 5,334,996 | 8/1994 | Tanigaki et al. | 345/152 |
| 5,341,153 | 8/1994 | Benzschawel et al. | 345/152 |
| 5,349,451 | 9/1994 | Dethardt | 358/518 |
| 5,467,102 | 11/1995 | Kuno et al. | 345/1 |
| 5,543,819 | 8/1996 | Farwell et al. | 345/150 |
| 5,544,306 * | 8/1996 | Deering et al. | 345/185 |
| 5,548,305 | 8/1996 | Rupel | 345/150 |
| 5,555,360 | 9/1996 | Kumazaki et al. | 395/143 |
| 5,633,654 | 5/1997 | Kennedy, Jr. et al. | 345/114 |
| 5,689,283 | 11/1997 | Shirochi | 345/132 |
| 5,767,837 | 6/1998 | Hara | 345/152 |
| 5,821,913 | 10/1998 | Mamiya | 345/88 |
| 5,847,698 | 12/1998 | Reavey et al. | 345/173 |
| 5,870,109 * | 2/1999 | McCormack et al. | 345/515 |
| 5,886,701 * | 3/1999 | Chauvin et al. | 345/418 |
| 5,894,300 | 4/1999 | Takizawa | 345/115 |
| 5,929,872 * | 7/1999 | Greene | 345/524 |
| 5,949,643 | 9/1999 | Batio | 361/681 |
| 5,963,185 | 10/1999 | Havel | 345/83 |

OTHER PUBLICATIONS

Abram, G. et al. "Efficient Alias–free Rendering using Bit–masks and Look–Up Tables" *San Francisco*, vol. 19, No. 3, 1985 (pp. 53–59).

Ahumada, A.J. et al. "43.1: A Simple Vision Model for Inhomogeneous Image–Quality Assessment" *1998 SID*.

Barbier, B. "25.1: Multi–Scale Filtering for Image Quality on LCD Matrix Displays" *SID 96 Digest*.

(List continued on next page.)

*Primary Examiner*—Kee M. Tung
(74) *Attorney, Agent, or Firm*—Workman, Nydegger & Seeley

(57) ABSTRACT

Improving a process in which information is read, modified, and written, and in which reading information is more costly (e.g., slower) than writing information. The information may be pixel information from a second (or remote) image and the modification may be a blending operation with a first (or local) image. The pixel information of the second (or remote) image may be stored in a video display frame buffer at a display adapter. The display adapter may be coupled via a bus, such as a PCI bus for example, with a CPU (or other machine) which performs the modification, such as image blending for example. This process is improved by limiting the number of reads of the pixel information of the second (or remote) image. Further, reads may be combined when doing so improves read performance and when alignment conditions are met. All modify and all or some write steps may be performed after all read steps have been performed, rather than performing all three (3) steps on a pixel-by-pixel, or pixel vector-by-pixel vector basis.

48 Claims, 19 Drawing Sheets

OTHER PUBLICATIONS

Barten, P.G.J. "P–8: Effect of Gamma on Subjective Image Quality" *SID 96 Digest*.

Beck. D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung, C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43.3 How Fill Factor Affects Display Image Quality" (c) *1998 SID*.

"Cutting Edge Display Technology—The Diamond Vision Difference" www.amasis.com/diamondvision/technical.hmtl, Jan. 12, 1999.

"Exploring the Effect of Layout on Reading from Screen" http://fontweb/internal/repository/research/explore.asp?RES=ultra, 10 pages, Jun. 3, 1998.

"How Does Hinting Help?" http://www.microsoft.com/typography/hinting/how.htm/fname=%20&fiszie, Jun. 30, 1997.

"Legibility on screen: A report on research into line length, document height and number of columns" http://fontweb/internal/repository/research/scrnlegi.asp?RES=ultra Jun. 3, 1998.

"The Effect of Line Length and Method of Movement on reading from screen" http://fontweb/internal/repository/research/linelength.asp?RES=ultra, 20 pages, Jun. 3, 1998.

"The Legibility of Screen Formats: Are Three Columns Better Than One?"http://fontweb/internal/repository/research/scrnformat.asp?RES=ultra, 16 pages, Jun. 3, 1998.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize, Jun. 30, 1997.

"TrueType fundamentals" http://www.microsoft.com/OTSPEC/TTCH01.htm?fname=%20&fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

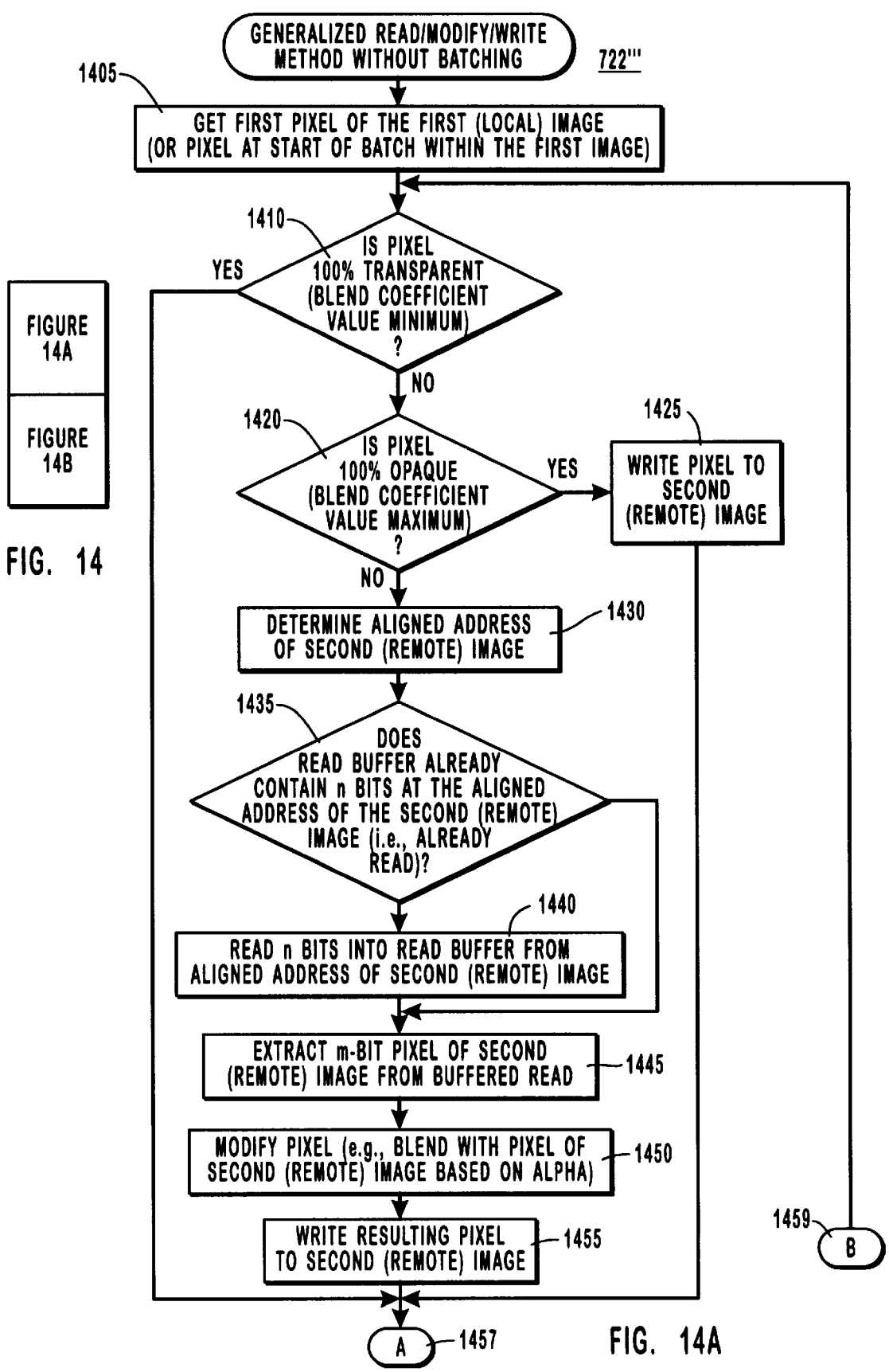

METHODS AND APPARATUS FOR IMPROVING READ/MODIFY/WRITE OPERATIONS

§ 1. BACKGROUND OF THE INVENTION

§ 1.1 Field of the Invention

The present invention concerns read, modify and write operations which may be used, for example, when blending images. For example, the present invention may concern blending a first image, such as a character(s) for example, with a second image.

§ 1.2. Related Art

§ 1.2.1 Compositing Images

Images, such as bitmap images, JPEG images, GIF images, etc., for example, may be combined into a single display frame to be rendered on a display device. Separate images may be rendered on separate, distinct, sections of the display frame. Often, however, rendering more than one image on a common section of the display frame is desired. In such instances, one or more foreground images may be rendered over a background image. Potential sources of foreground and background images are introduced in § 1.2.1.1 below. Then, various known methods of compositing images are introduced in §§ 1.2.1.2 through 1.2.1.4 below.

§ 1.2.1.1 Image Sources and Communicating Images from their Sources

In a personal computing system, the background (or second or remote) image may be stored in a frame buffer on a video driver card, while a foreground (or first or local) image may be available closer to the means for performing the modification, such as a central processing unit for example. In most Pentium-based computers and in the Apple Power Macintosh computer, a peripheral component interconnect (or "PCI") local bus is used to transfer data between hardware devices, adapters, and other bus backplanes. An AGP bus may be similarly used. The PCI bus may be coupled with the host CPU and main memory through a bridge device that controls the data transfers between the CPU, cache, and main memory.

§ 1.2.1.2 Sprite Operations and their Perceived Limitations

"Sprites" may be thought of as foreground images to be composited over a background image or background images. As shown in FIG. 1, sprites 110, each of which may be thought of as a picture with an irregular shape, possibly with transparent holes, that can be moved on the screen and which has a depth, may be rendered on a background image 120 to produce a composite image 130 in an off-screen buffer storage area 140. The contents of the off-screen buffer storage area 140 may then be combined as a frame 150 rendered on a display. (See, e.g., the electronic article Herman Rodent, "Animation in Win32," *Microsoft Developer Network*, at techart.chm::html/msdn_anim32.htm (Feb. 1, 1994).

§ 1.2.1.3 BitBlt Operations and their Perceived Limitations

As a further example of compositing a foreground image on a background image, referring to FIG. 2, character information 210, which may be a bitmap, may be combined with a background image 220 stored in a display frame buffer storage area 220 to generate a composite image 240. A block transfer (or "BLT") function may be used to modify and transfer bitmaps. The BitBlt function, supported by Windows NT® operating system from Microsoft Corporation of Redmond Wash., may be used to transfer bits from a rectangle on a source device to a rectangle, having the same dimensions, on a destination device. The bitmap character information 210 includes individual character bitmaps 212, also referred to as glyphs. Notice that each glyph 212 has a foreground color 214 and a background color 216. Notice, further, that in the composite image, the feature 222 of the background image 220 is obscured by both the foregrounds 214 of the glyphs 212, as well as the backgrounds 216 of the glyphs 212. Unfortunately, displaying only the foreground (that is, only the character information) 214 of the glyphs 212 may be desired in many instances.

There are some techniques for performing transparency operations with bitmaps. (See, e.g., the article, Ron Gery, "Bitmaps with Transparency," *Microsoft Developer's Network*, techart.chm::/html/msdn_transblt.htm (Jun. 1, 1992). In this regard, there are "alpha-blt" operations which permit a first image and second image to be blended together based on a blend coefficient (also referred to as "alpha"). Unfortunately, if the second image is stored away from where these operations take place (e.g., the CPU), which is often the case, it must be read (e.g., by the CPU) which may be a relatively slow operation. Further, bitblt and alpha-blt operations are performed on a pixel basis, which is not appropriate for newly developed high resolution rendering systems which operate on a pixel sub-component level. (See, e.g., U.S. patent application Ser. No. 09/240,653, filed on Jan. 29, 1999 and incorporated herein by reference.)

§ 1.2.1.4 Combining Images Using a Blend Coefficient

Blending is a way to combine two samples using their color components, as weighted by their blend coefficient (or alpha) values. Alpha blending allows colors (or materials or textures) on a surface to be blended, with transparency, onto another surface. For example, blending may combine a pixel's (or pixel group's, or bitmap's) color with that of a pixel stored in a video frame buffer storage area at a corresponding location. The blending depends on the alpha value of the fragment and that of the corresponding currently stored pixel. For example, the DXCompositeOver function uses the alpha value of a source (or first) sample to combine colors of the source (or first) sample with that of a destination (or second) sample. More specifically, with the DXCompositeOver function, the source (or first) sample is scaled by alpha, the destination (or second) sample is scaled by the inverse of alpha, and the two values are added. (See, e.g., the article, "Compositing Helper Functions," *Microsoft Developers Network*, dxmedia.chm::/dxmedia/help/dxt/reference/helpers/composit_h elpers.htm, p. 3.) On the other hand, with the DXCompositeUnder function, the destination (or second) sample is scaled by alpha, the source (or first) sample is scaled by the inverse of alpha, and the two values are added. Id. at pp. 3–4.

In some embodiments, the alpha information may be represented by a whole number from 0 to 255, where a 255 source alpha indicates that the source pixel is to overwrite the destination pixel (that is, the source pixel is 100 percent opaque) and a 0 source alpha indicates that the destination pixel is to be left unchanged (that is, the source pixel is 100 percent transparent). A value between (and not including) 0 and 255 means that the destination pixel should be read and combined with the source pixel to generate a new pixel. The new pixel is then to be written to the destination image to replace the original destination pixel.

For example, FIG. 3 illustrates a blending operation in which characters 312 have a foreground portion 314 with an alpha equal to 255 and a background portion 316 with an alpha equal to 0. Thus, when the glyph 310 is blended with the background image 330, the backgrounds (i.e., non-character pixels) 316 of the glyphs 312 do not obscure the feature 322 of the background image. That is, only the foreground portions (i.e., character pixels) 314 of the glyphs 312 overwrite the background image 330 in the resulting image 340.

Before two images can be blended, pixel(s) from each of the images must be read. Once the pixel(s) from each of the images are combined to generate a modified pixel, the modified pixel is written to a destination storage. Section 1.2.1.4.1 below describes a conventional method of reading pixel(s) from two images to be blended, modifying them, and writing them to a destination storage area.

§ 1.2.1.4.1 Piecewise Read-Modify-Write and its Perceived Shortcomings

FIG. 4 is a high level flow diagram of a method 400 for blending a first (or local) image (stored (temporally) close to the CPU which will perform the blending operation) with a second (or remote) image (stored (temporally) further from the CPU). In this method 400, it is assumed that the second (or remote) image is stored in a video frame buffer. First, as shown in act 410, a pixel (or pixels, in a "vector basis" blend operation) is read from the second (or remote) image. Then, in act 420, a blend operation is performed based on the read pixel(s) of the second (or remote) image, a corresponding pixel of the first (or local) image (e.g., a character), a foreground color of the first (or local) pixel, and a blend coefficient (alpha) to generate a modified pixel (or modified pixels). In act 430, the modified pixel(s) is then written back (e.g., written back to the video frame buffer storing the second (remote) image). Referring to conditional branch point 440, if there are more pixels, the method 400 continues back at act 410. If, on the other hand, there are no more pixels, the method 400 is left via RETURN node 450.

As is the case with the foregoing example, many "remote" images (or destination surfaces) have CPU read performance characteristics that are expensive relative to the cost of a write operation. For example, if a destination surface is stored in a video frame buffer of a video adapter card in a personal computer with a PCI bus, the present inventor has determined that the CPU might be able to read the destination surface from the video frame buffer at 8 MB/s, while the CPU might be able to write information to the video frame buffer at a rate of 200 MB/s. The present inventor has also determined that the read speed may depend on the width of the read request— if the CPU reads using 8-bit operations, the throughput may be 2 MB/s, if the CPU reads using 16-bit operations, the throughput may be 4 MB/s, and if the CPU reads using 32-bit operations, the throughput may be 8 MB/s. That is, a read request for 8-bits of information, 16-bits of information, or 32-bits of information may take about the same time. This is because the PCI bus is 32-bits wide.

Blending operations like that illustrated in FIG. 4, however, are often done on a pixel-by-pixel basis, or on a vector basis where a fixed number of pixels are processed in parallel. Typically, with pixel-by-pixel blending operations, read requests are issued when necessary at the size or smaller of the destination pixel. For example, if a blend is done to a second (or remote) image having 16 bits/pixel (or "bpp"), 16-bit read requests will typically be used. In another example, if a blend is done to a second (or remote) image having 24 bpp, 8-bit read requests will typically be used.

With vector blending, read requests are typically issued at the size of the vector size. For example, if a blend is done to a destination image having 16 bpp and the blending operation handles 4 pixels at once, 64-bit reads will typically be used.

Read requests that are greater than 8-bits should be properly aligned. For example, a 32-bit read request should be done from an address that is a multiple of four (4) bytes (32 bits). The alignment requirement stems from limitations on the types of reads supported by the processor and therefore, by the operating system.

As can be appreciated, in the conventional method 400 for blending a first (local) image (stored (temporally) close to the CPU to perform the blending operation) with a second (remote) image (stored (temporally) further from the CPU), a "bottleneck" is caused by the read operations. Thus, better methods and apparatus are needed to blend two (2) images, particularly when one image is stored at a location separated from the machine (e.g., a CPU) performing the blend operation by a bus having relatively slow read performance. These method and apparatus should work with new techniques for rendering images at high resolutions by operating on pixel sub-components, rather than merely operating on pixels.

§ 2. SUMMARY OF THE INVENTION

The present invention optimizes a process in which information is read, modified, and written, and in which reading information is more costly (e.g., slower) than writing information. The information may be pixel information of a second (or remote) image and the modification may be a blending operation with a first (or local) image. The present invention may do so by limiting the number of reads of the pixel information of the second (or remote) image. Further, the present invention may combine reads when doing so improves read performance. For example, as discussed above, over a PCI bus, the time for performing a 8-bit read, a 16-bit read, or a 32-bit read are roughly the same. The present invention may combine reads when adjacently stored information (e.g., two adjacent pixels) is needed and alignment conditions are met. Finally, the present invention may perform all modify and all or some write steps only after all read steps have been performed, rather than performing all three (3) steps on a pixel-by-pixel, or pixel vector-by-pixel vector basis. The modification may be performed on a pixel sub-component basis, rather than on a pixel basis.

§ 3. BRIEF DESCRIPTION OF THE DRAWINGS

Figure 12A:
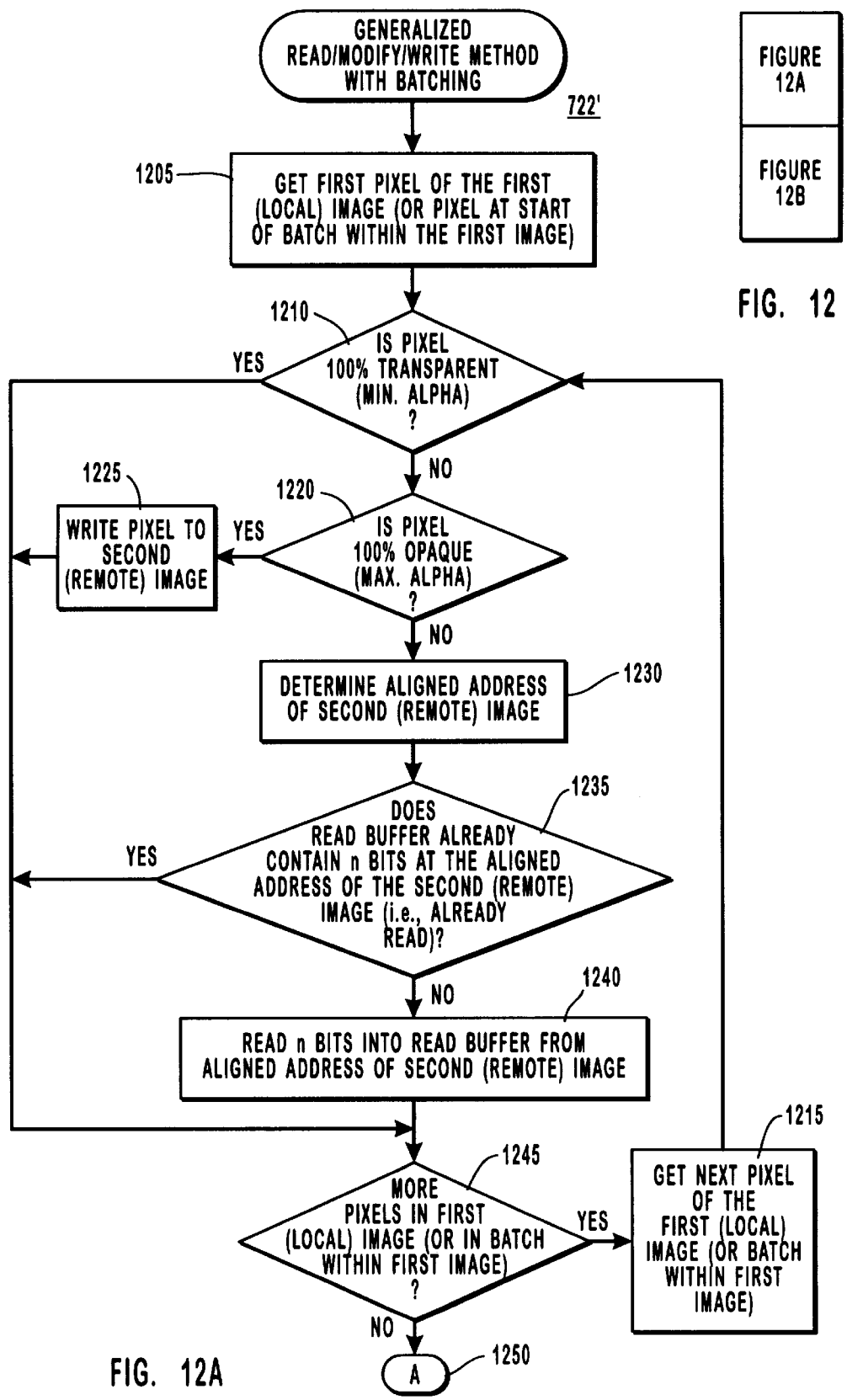
Figure 12B:
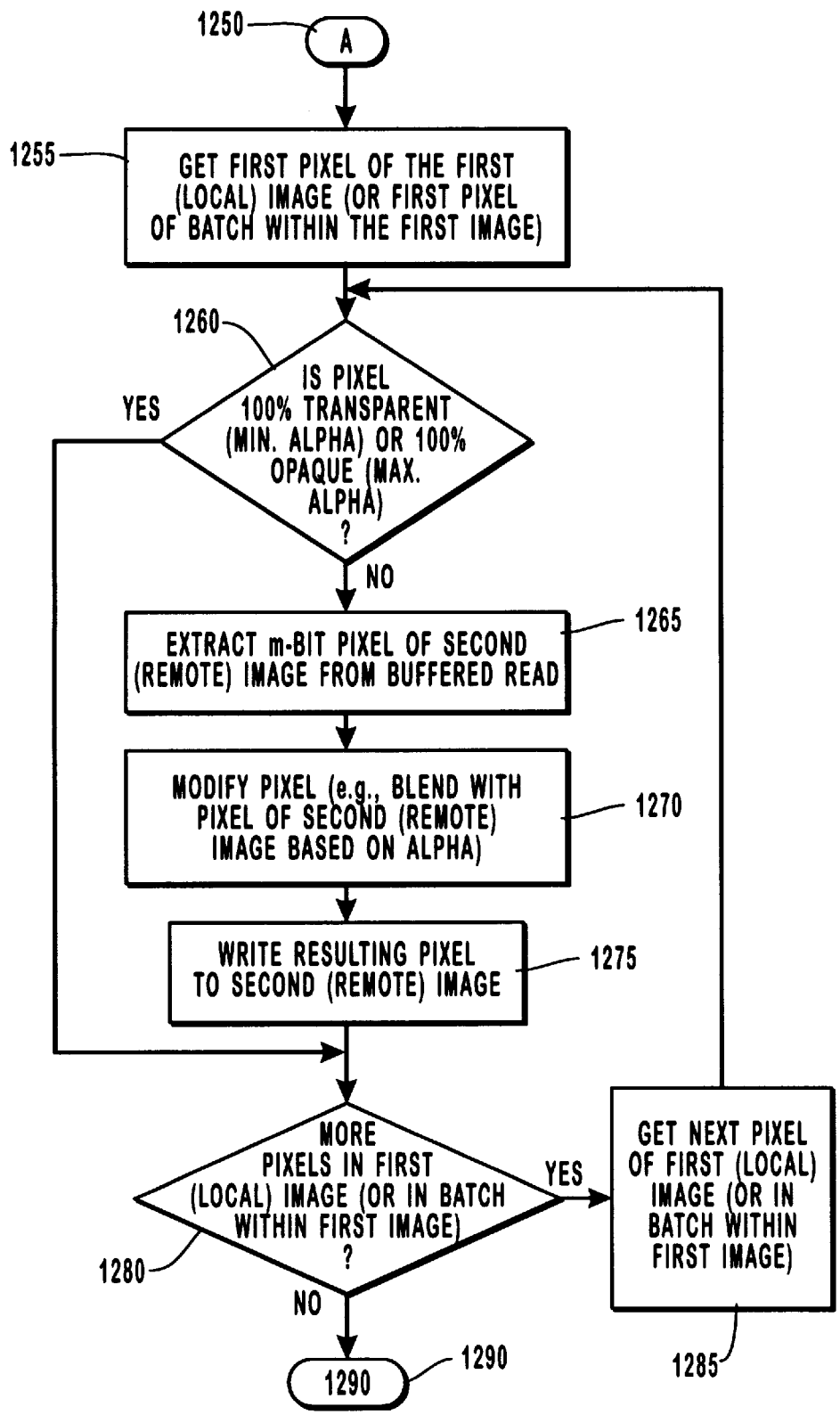

FIG. 12, which includes FIGS. 12A and 12B, is a flow diagram of an exemplary read/modify/write method which "batches" reads and writes in one loop and modifies and writes in another loop, for a system having an n-bit data bus and a second (or remote) image having m bits per pixel.

Figure 13A:
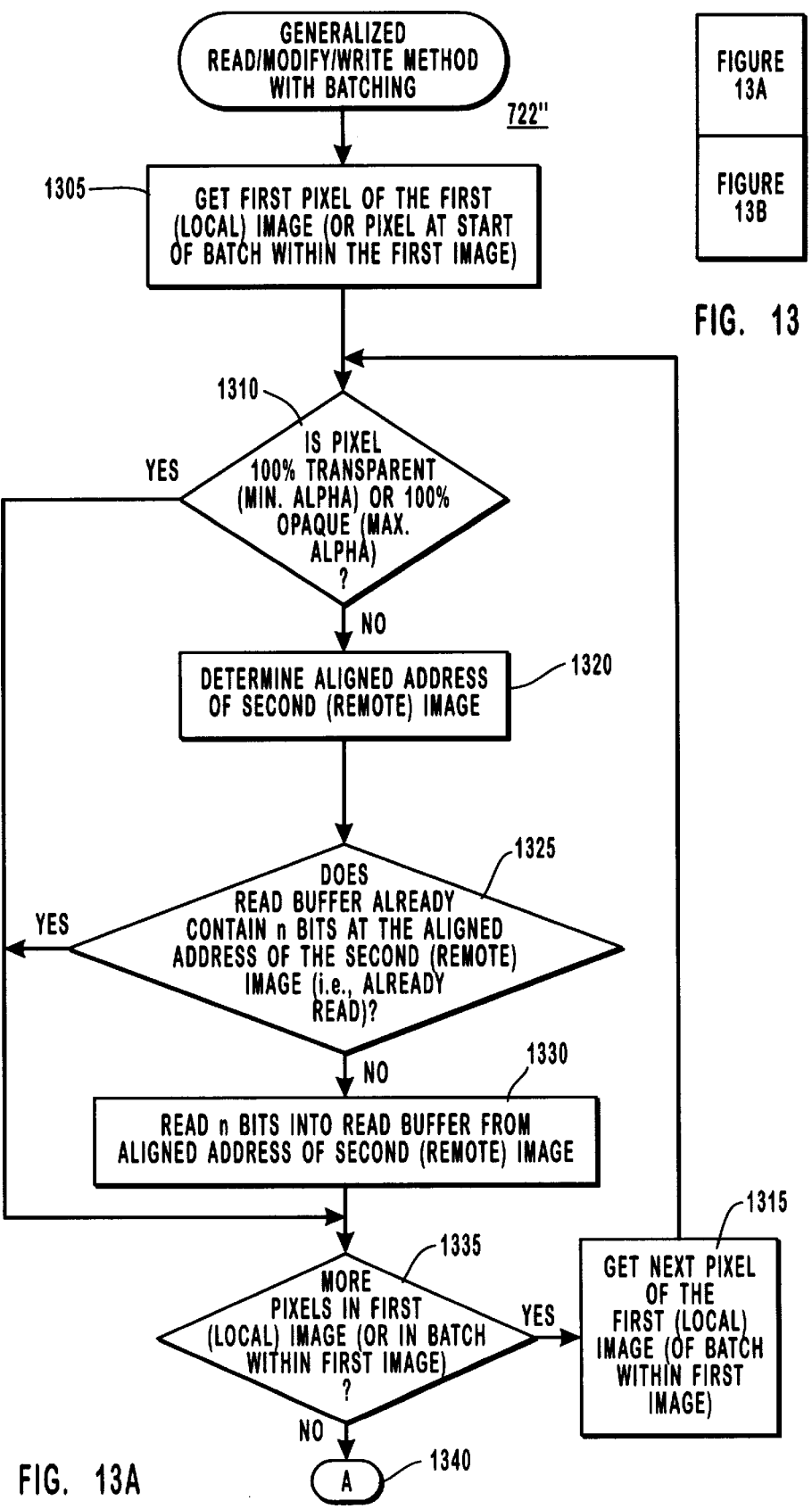
Figure 13B:
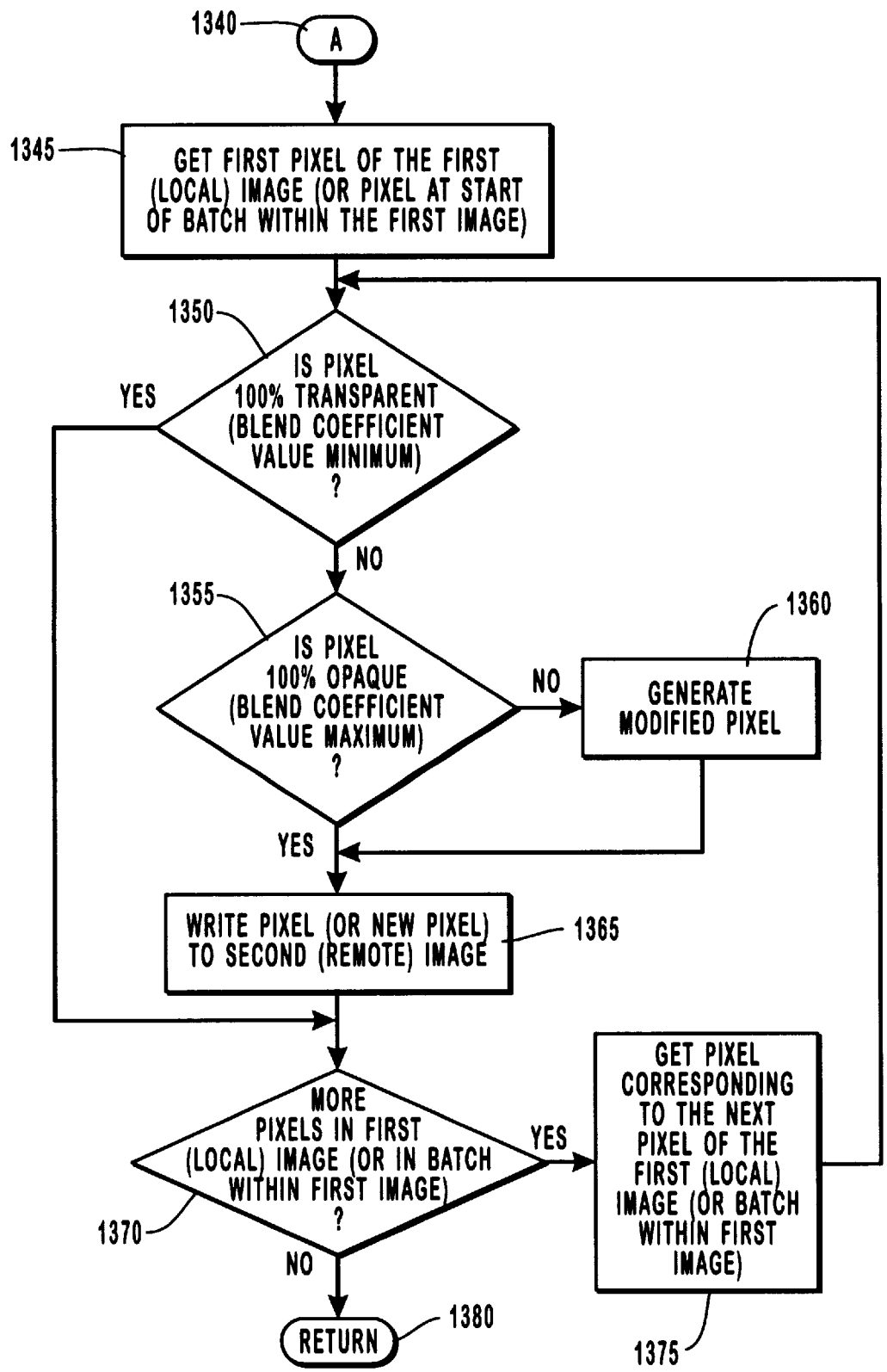

FIG. 13, which includes FIGS. 13A and 13B, is a flow diagram of an exemplary read/modify/write method which "batches" reads in one loop and modifies and writes in another loop, for a system having an n-bit data bus and a second (or remote) image having m bits per pixel.

Figure 14B:
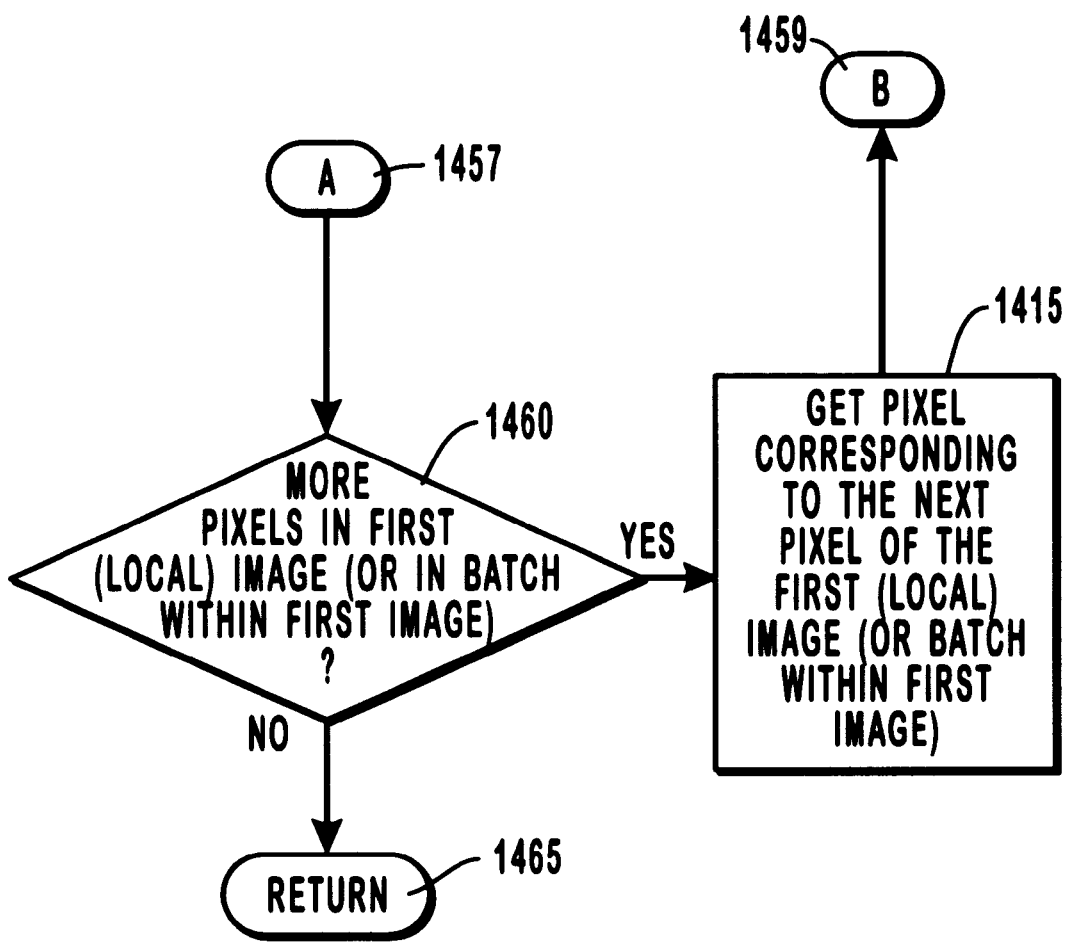

FIG. 14, which includes FIGS. 14A and 14B, is a flow diagram of an exemplary read/modify/write method which performs reads, modifies, and writes within the same loop, for a system having an n-bit data bus and a second (or remote) image having m bits per pixel.

Figure 15:
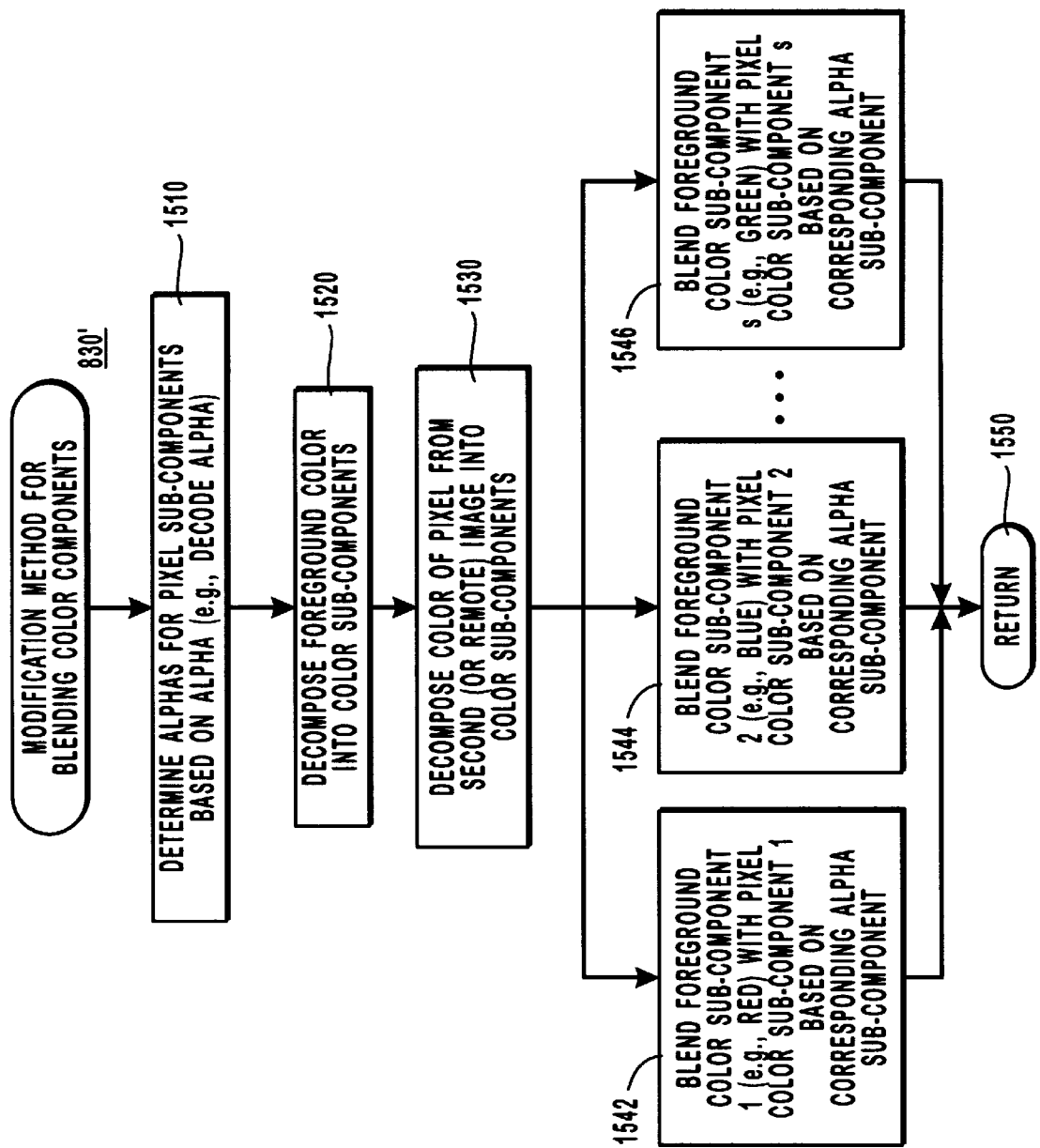

FIG. 15 is a flow diagram of an exemplary method for effecting an exemplary pixel modification process which operates on a pixel sub-component (or on a color component) basis.

Figure 16:
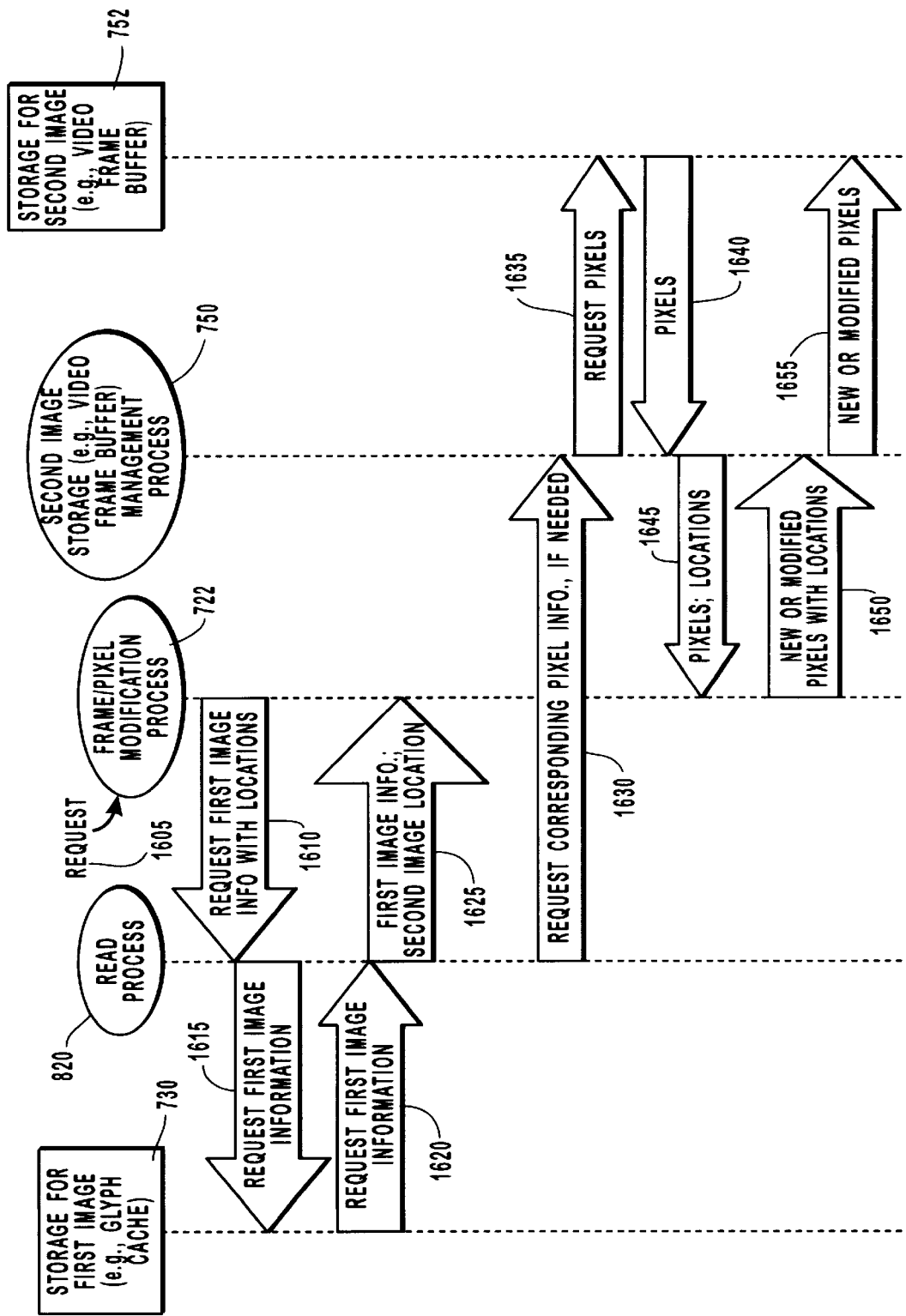

FIG. 16 is a diagram which illustrates the flow of data and information between processes, which may be used to effect at least some aspects of the present invention, during an operation of the present invention.

§ 4. DETAILED DESCRIPTION

The present invention concerns novel techniques for optimizing a process in which information is read, modified, and written, and in which reading information is more costly (e.g., slower) than writing information. The information may be pixel information of a destination (or remote) image and the modification may be a blending operation with a first (or local) image. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Before describing details of various embodiments or methods of the present invention, certain terms used in the description are defined here. An "image" may be (though is not necessarily) an array of pixels, such as a bitmap for example. A "modification" of information may be (though is not necessarily) a blend operation between a first image and a second image for example. If the cost, for example a temporal cost, of reading the first information is low relative to the cost of reading the second information, the first information may be referred to as "local" information while the second information may be referred to as "remote" information. If the remote information is to be overwritten, at least in part, by new information, such remote information may be referred to as "destination" information. A "location" of information, such as the location of a pixel within a bitmap for example, may be (though is not necessarily) expressed as an x, y coordinate set within the bitmap, a memory location of a memory device which stores the bitmap, or a memory offset (or "relative memory location") from a fixed memory location of a memory device which stores the bitmap.

In the following, functions which may be performed by the present invention are introduced in § 4.1. Then, environments in which the present invention may operate are introduced in § 4.2. Next, exemplary processes and data structures which may be used by the present invention are described in § 4.3. Then, exemplary methods which may be used to effect the exemplary processes are described in § 4.4. Thereafter, an example which illustrates the operation of an exemplary embodiment of the present invention is described in § 4.5. Finally, advantages of the present invention are summarized in § 4.6.

§ 4.1 Functions

As discussed in the "Summary of the Invention" in § 2 above, the present invention may function to optimize a process in which information is read, modified, and written, and in which reading information is more costly (e.g., slower) than writing information. The information may be pixel information from a second (or remote) image and the modification may be a blending operation with a first (or local) image. The pixel information of the second (or remote) image may be stored in a video display frame buffer at a display adapter. The display adapter may be coupled via a bus, such as a PCI bus for example, with a CPU (or other machine) which performs the modification, such as image blending for example.

The present invention may accomplish this basic function by limiting the number of reads of the pixel information of the second (or remote) image. Further, the present invention may combine reads when doing so improves read performance and when alignment conditions are met. Finally, the present invention may perform all modify and all or some write steps only after all read steps have been performed, rather than performing all three (3) steps on a pixel-by-pixel, or pixel vector-by-pixel vector basis.

§ 4.2 Exemplary Environment (PC Architecture)

Figure 1:
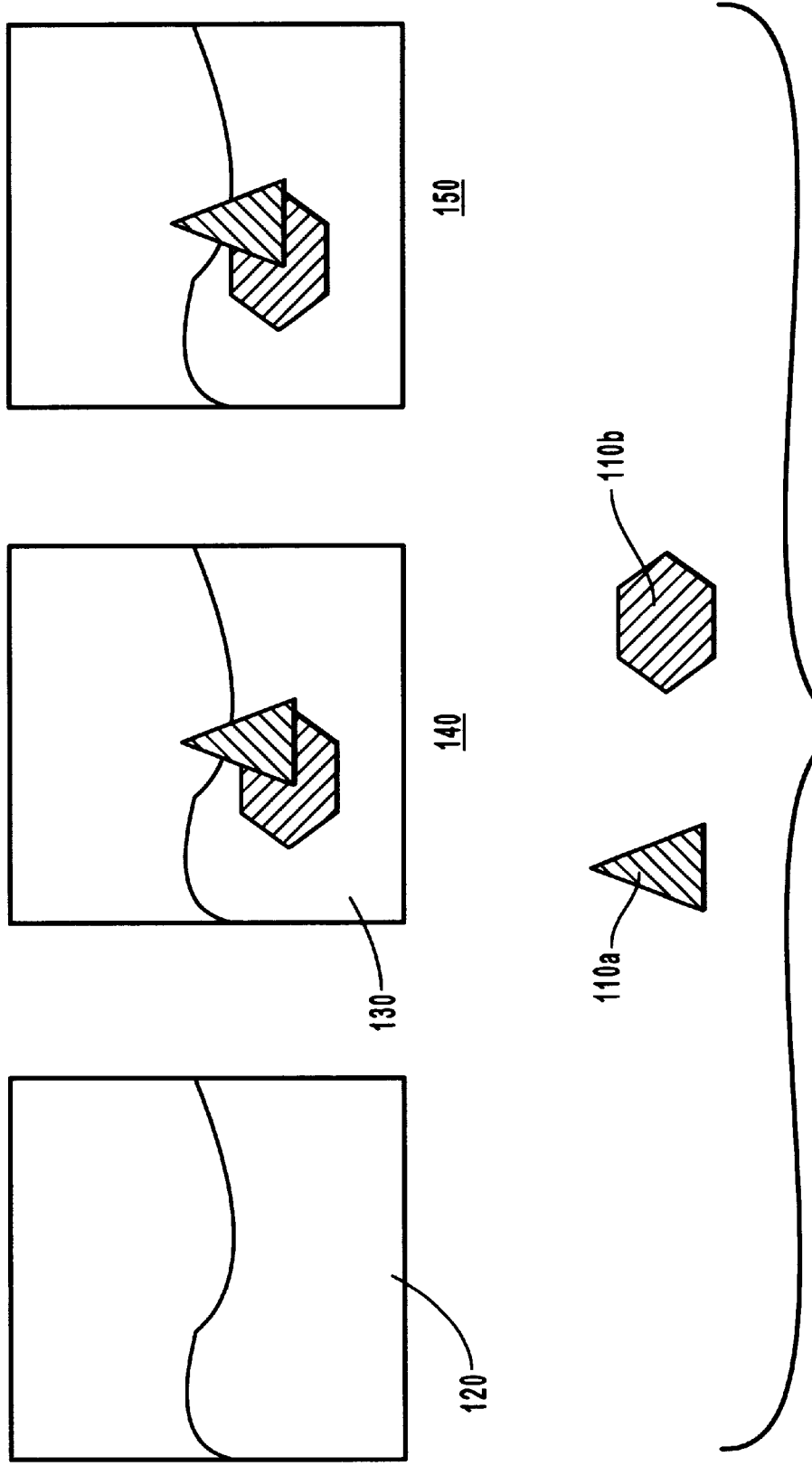
FIG. 1 illustrates the use of sprites to create a composite image.
Figure 2:
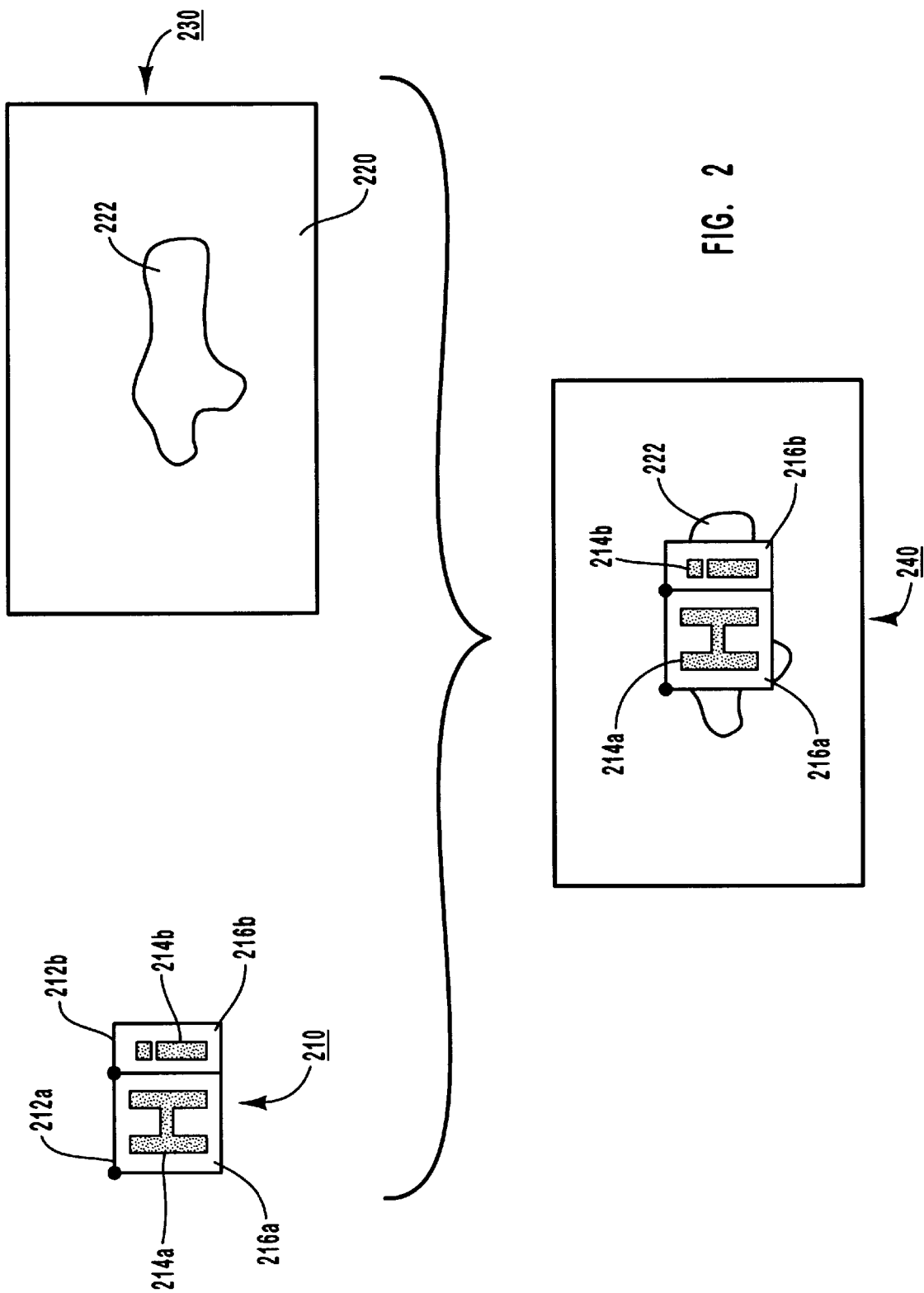
FIG. 2 illustrates the use of bitblt functions to create a composite image.
Figure 3:
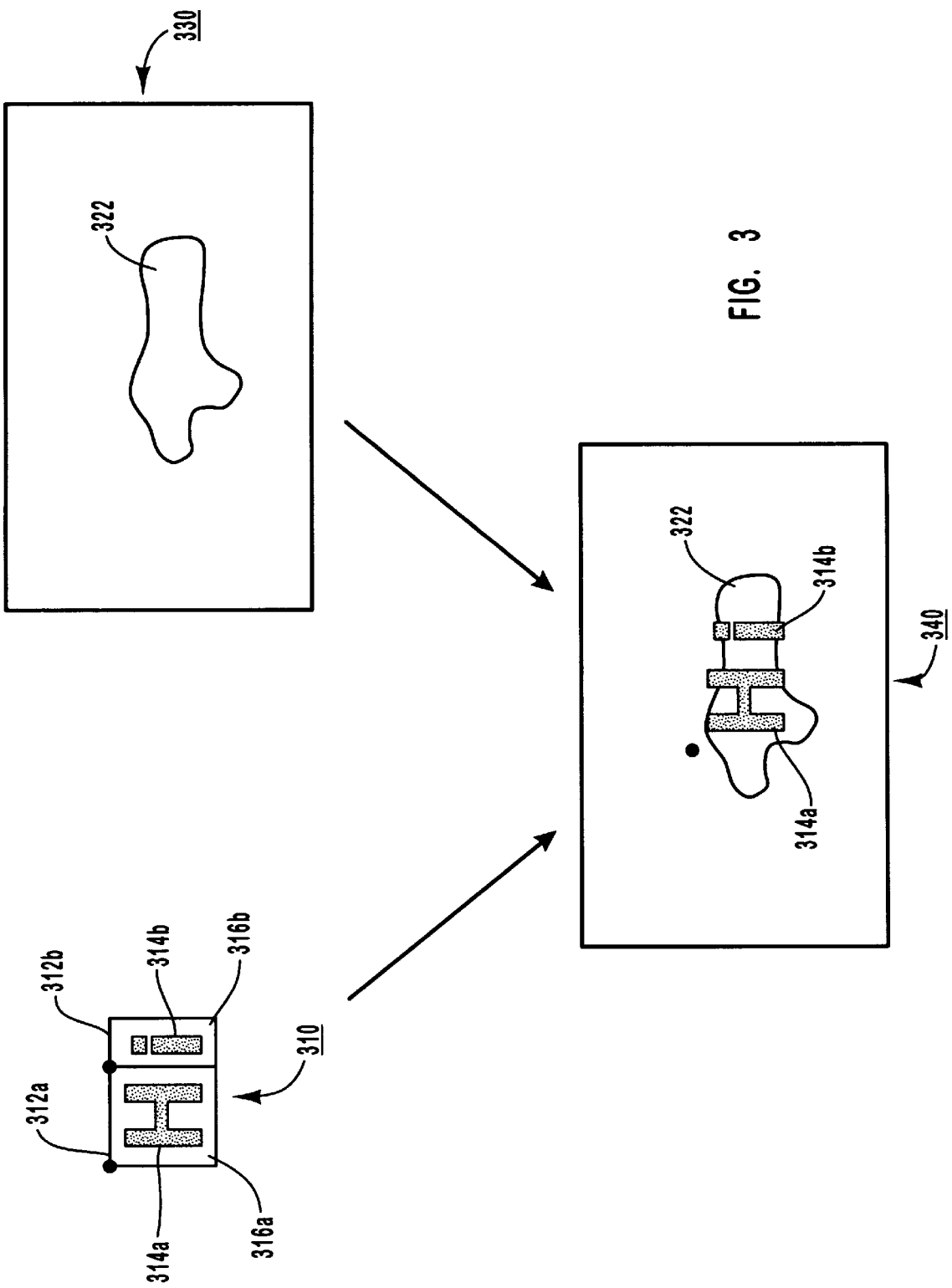
FIG. 3 illustrates the use of blending functions to create a combined image.
Figure 4:
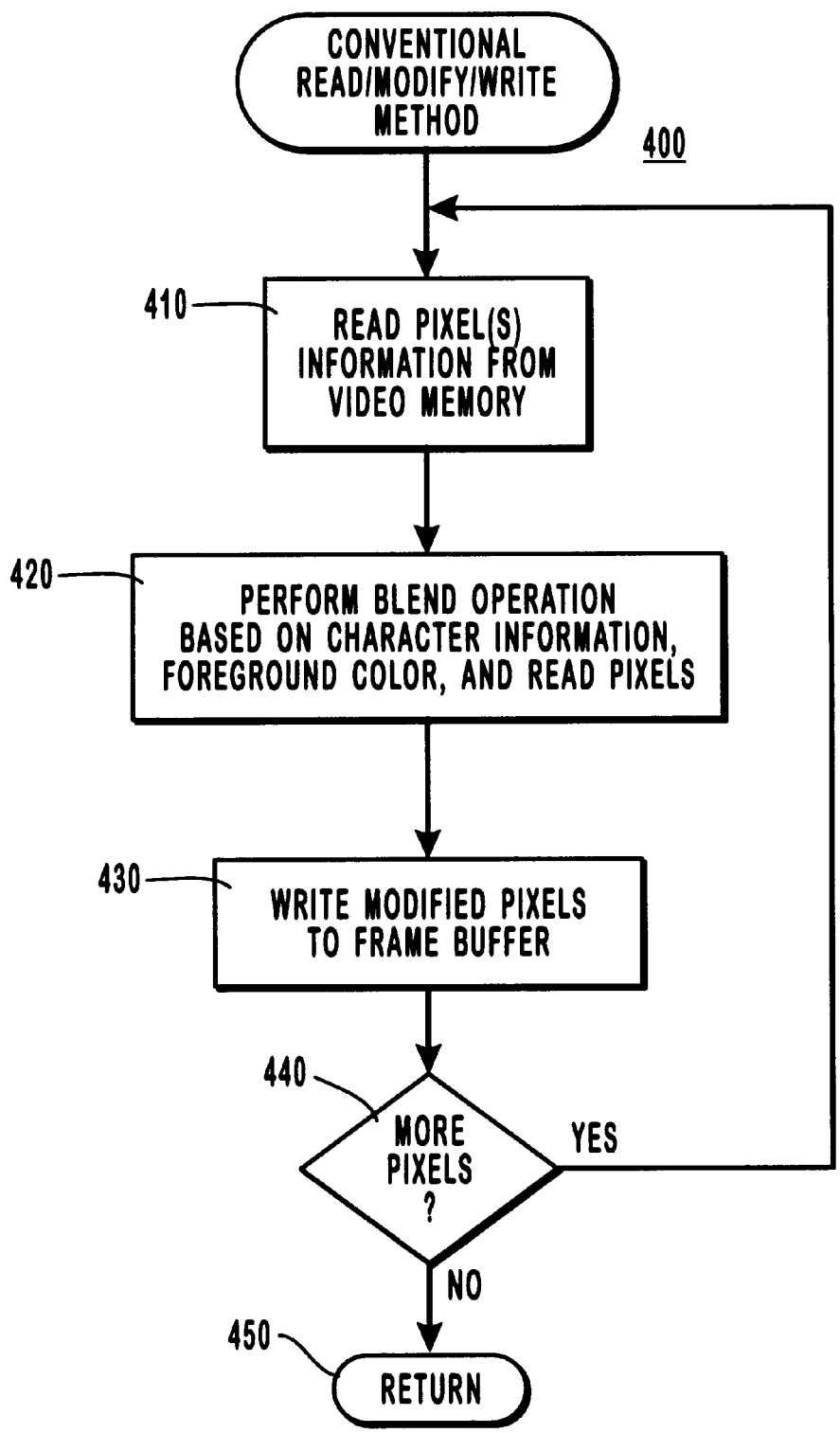
FIG. 4 is a high level flow diagram of a conventional blending operation in which destination (or "remote") pixels must be read, modified, and then written.
Figure 5:
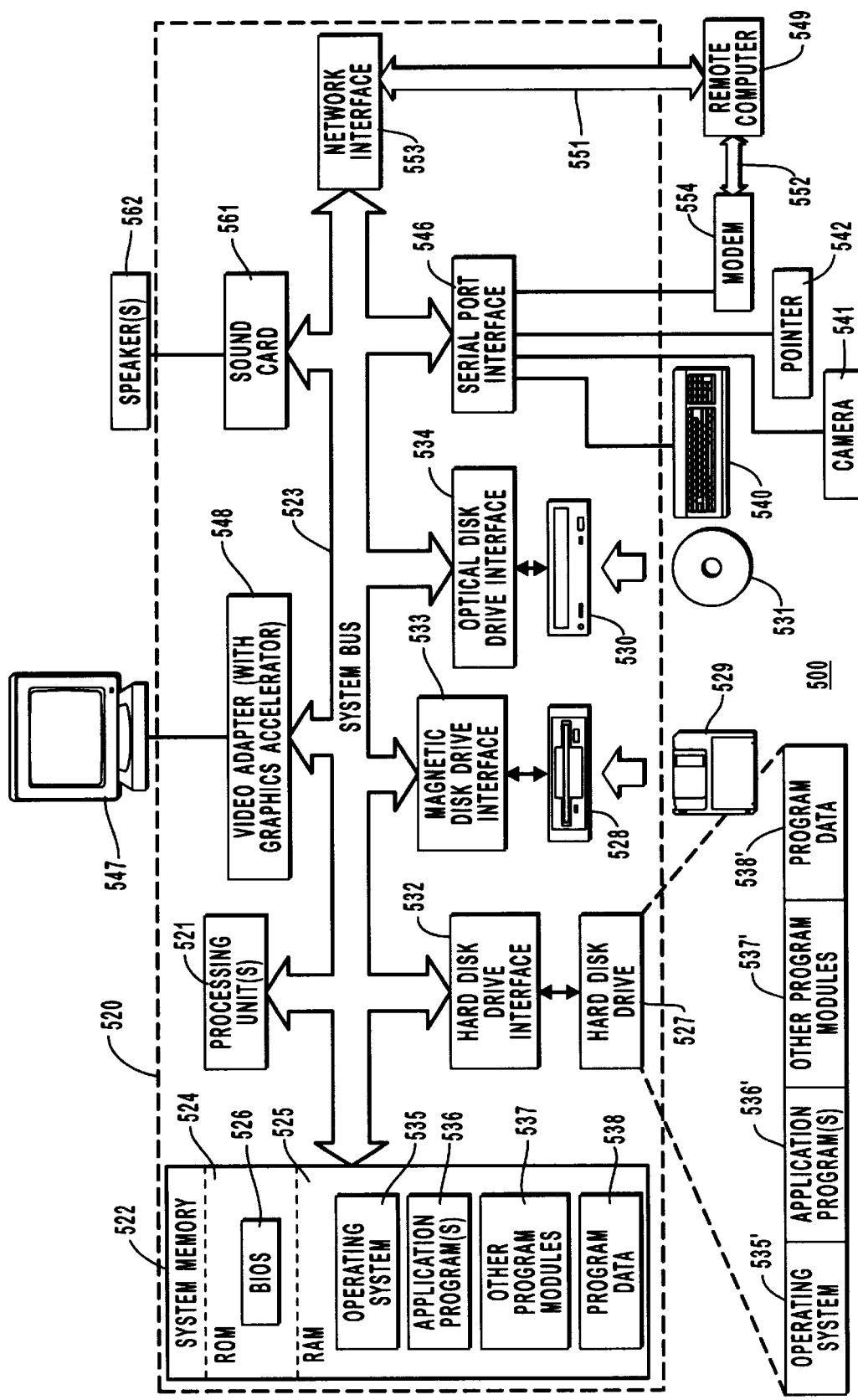
FIG. 5 is a block diagram of an environment in which at least some aspects of the present invention may operate, and which may be used to effect at least some aspects of the present invention.
Figure 6:
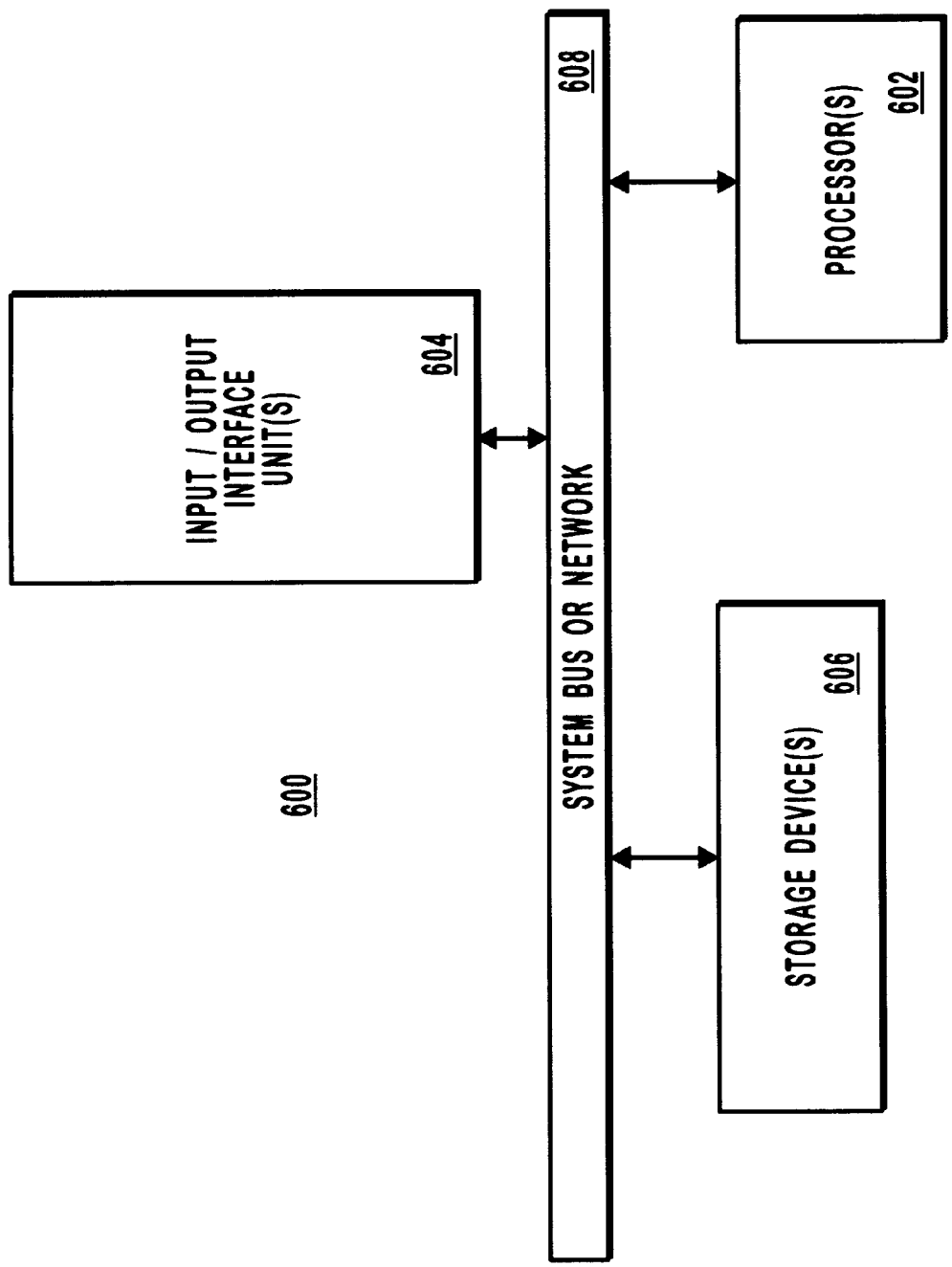
FIG. 6 is a high level block diagram of an environment in which at least some aspects of the present invention may operate, and which may be used to effect at least some aspects of the present invention.

FIGS. 5 and 6 and the following discussion provide a brief, general description of exemplary apparatus in which at least some aspects of the present invention may be implemented. Various methods of the present invention will be described in the general context of computer-executable instructions, such as program modules and/or routines for example, being executed by a computing device such as a personal computer. Other aspects of the invention will be described in terms of physical hardware such as display device components and display cards for example.

Naturally, the methods of the present invention may be effected by apparatus other than those described. Program modules may include routines, programs, objects, components, data structures (e.g., look-up tables, etc.) that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

FIG. 5 is a block diagram of an exemplary apparatus 500 which may be used to implement at least some aspects of the present invention. A personal computer 520 may include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures, such as the PCI bus architecture discussed in §§ 1.2.1.1 and 1.2.1.4.1 above. The system 522 memory may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 523, magnetic disk 529, (magneto) optical disk 531, ROM 524 or RAM 525, such as an operating system 535, one or more application programs 536, other program modules 537, display driver 532, and/or program data 538 for example. The RAM 525 can also be used for storing data used in rendering images for display as will be discussed below. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system bus 523 via an interface, such as a display adapter 548, for example. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5 include a local area network (LAN) 551 and a wide area network (WAN) 552 (such as an intranet and the Internet for example).

When used in a LAN, the personal computer 520 may be connected to the LAN 551 through a network interface adapter card (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

FIG. 6 is a more general machine 600 which may effect at least some aspects of the present invention. The machine 600 basically includes a processor(s) 602, an input/output interface unit(s) 604, a storage device(s) 606, and a system bus or network 608 for facilitating data and control communications among the coupled elements. The processor(s) 602 may execute machine-executable instructions to effect one or more aspects of the present invention. At least a portion of the machine executable instructions and data structures may be stored (temporarily or more permanently) on the storage devices 606 and/or may be received from an external source via an input interface unit 604.

§ 4.3 Exemplary Processes and Data Structures

Figure 7:
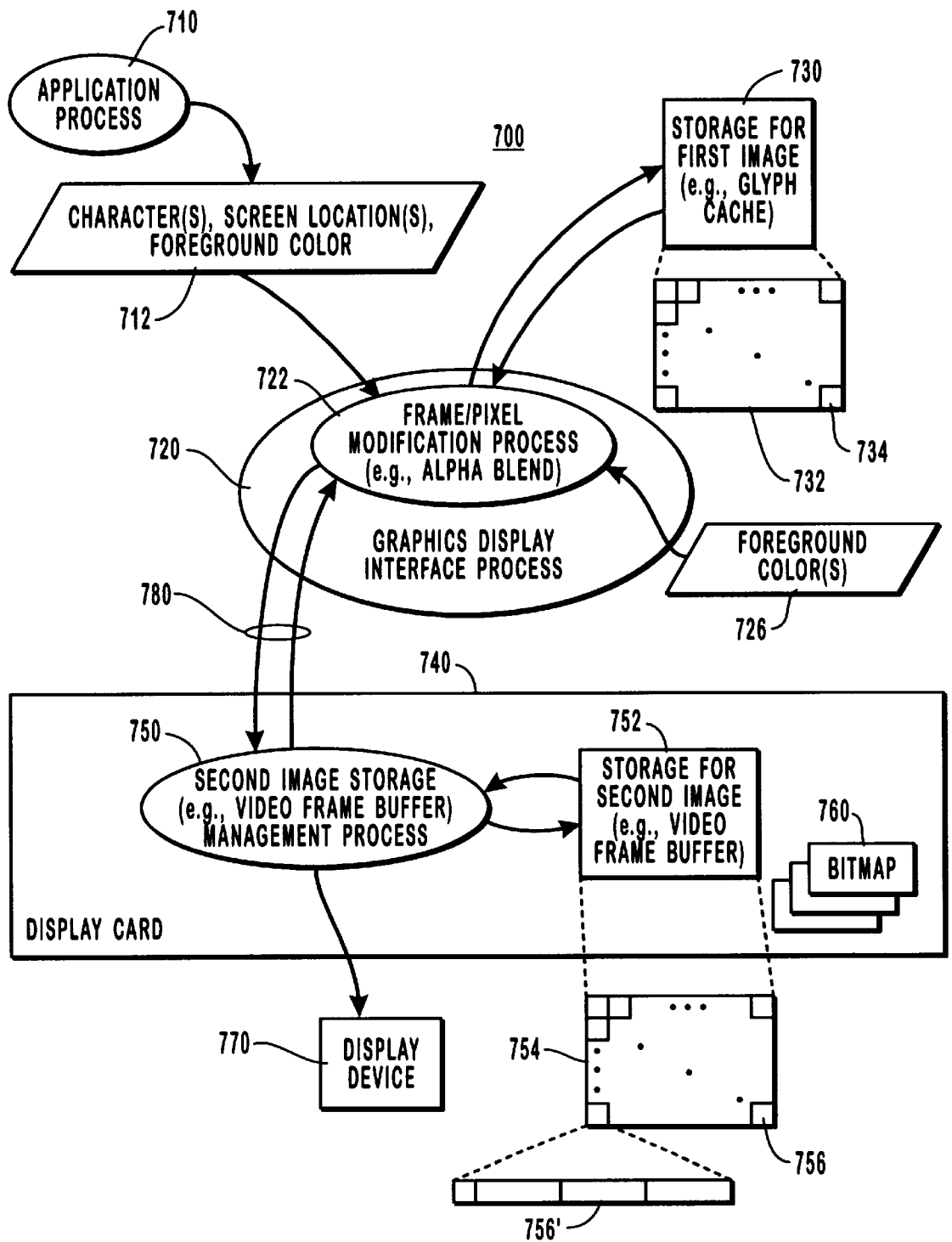
FIG. 7 illustrates processes which may be used to effect at least certain aspects of the present invention.

FIG. 7 is a high level diagram of processes that may be used to effect at least some aspects of the present invention. In this system 700, a graphics display interface process (or more generally, a graphics display interface facility) 720, which may be a part of an operating system 535 run by processing unit(s) 521, may be used to modify (e.g., to blend character information) first (or local) information from a first storage unit (e.g., a glyph cache) 730 with other information (e.g., a second or remote image) from a second storage unit (e.g., a video frame buffer) 752, which may be situated on a display card 740. An application process 710 may submit a request 712 to display particular characters at particular screen locations to the graphics display interface process 720. In addition to the character(s) and the screen location(s), the request 712 may include a foreground color (or foreground colors) in which the characters are to be rendered. Alternatively, the foreground color(s) 726 may be provided from elsewhere.

Each of the first images (e.g., glyphs) stored in the first storage unit 730 may include an array or bitmap 732. Each element 734 of the array or bitmap 732 may include a blend coefficient (or alpha) value. The blend coefficient value may range from a minimum value (e.g., 0) to a maximum value (e.g., 255). As described in U.S. patent application Ser. No. 09/273,147 filed on Mar. 19, 1999 (incorporated herein by reference), in a system for rendering characters at enhanced resolution), the elements 734 of the array or bitmap 732 may be packed pixel values. The packed pixel values may range from a minimum value (e.g., 0) to a maximum value (e.g., 179). A first image location to second image location transform process (not shown) may use the requested screen location 712 to convert locations of pixels of the first image (e.g., glyph) 732 to locations of pixels in the second image (e.g., the image stored in the video frame buffer) 752. Basically, in the context of rendering character information, the location transform process (not shown) may use the requested screen location (and perhaps a pixel offset to an anchor location or "hot spot" of the glyph) to determine a starting memory location (or memory location offset) at which the glyph is to be stored in the second storage unit (e.g., the video frame buffer) 752.

Referring now to the second storage unit (e.g., video frame buffer) 752, a second image 754 stored therein may include an array of pixels. The size of the array typically corresponds to the resolution of a display device 770 on which the frame is to be rendered. Each of the pixels 756 of the array 754 may encode information related to color components of the pixel. For example, in a sixteen (16) bit per pixel (or "bpp") formatted pixel 7561, the most significant bit may be undefined, the next five (5) bits may encode a red component value (having 32 possible quantities), the next five (5) bits may encode a green component value (having 32 possible quantities), and the last five (5) bits may encode a blue component value (having 32 possible quantities). A second image storage (e.g., video frame buffer) management process (or more generally, a second image storage manager) 750 may be used to read requested information from the second storage device 752. The display card 740 may also include bitmap storage 760. The application process 710 may use this bitmap storage 760 to store graphics elements, such as icons, toolbars, etc., that it may or will need to display.

A communications link 780 may be used to permit information or data to be communicated between the frame/pixel modification process (or frame/pixel modification facility) 722 of the graphics display interface process 720 and the second image storage (e.g., video frame buffer) management process 750. Referring to both FIGS. 5 and 7, if, for example, the graphics display interface process 720 is to be a part of the operating system 535 executed by the processing unit(s) 521, and if the video frame management process 750 is to be effected by the video adapter (card) 548, then the communications link 780 may be system bus 523. As discussed in § 1.2.1.1 above, most Intel Pentium™ based personal computers and most Power Macintosh computers use a PCI or AGP bus as their system bus 523. Recall from § 4 above that "local" information may be accessed faster than "remote" information. In the system 700, information that can be accessed by the graphics interface process 722 without using the communication link 780 may be considered "local" information (See, e.g., the glyphs stored in glyph cache 730.), while information that can be accessed by the graphics display interface process 722 only via the communications link 780 may be considered "remote" information (See, e.g., frame 754 stored in the video frame buffer 752.).

Figure 8:
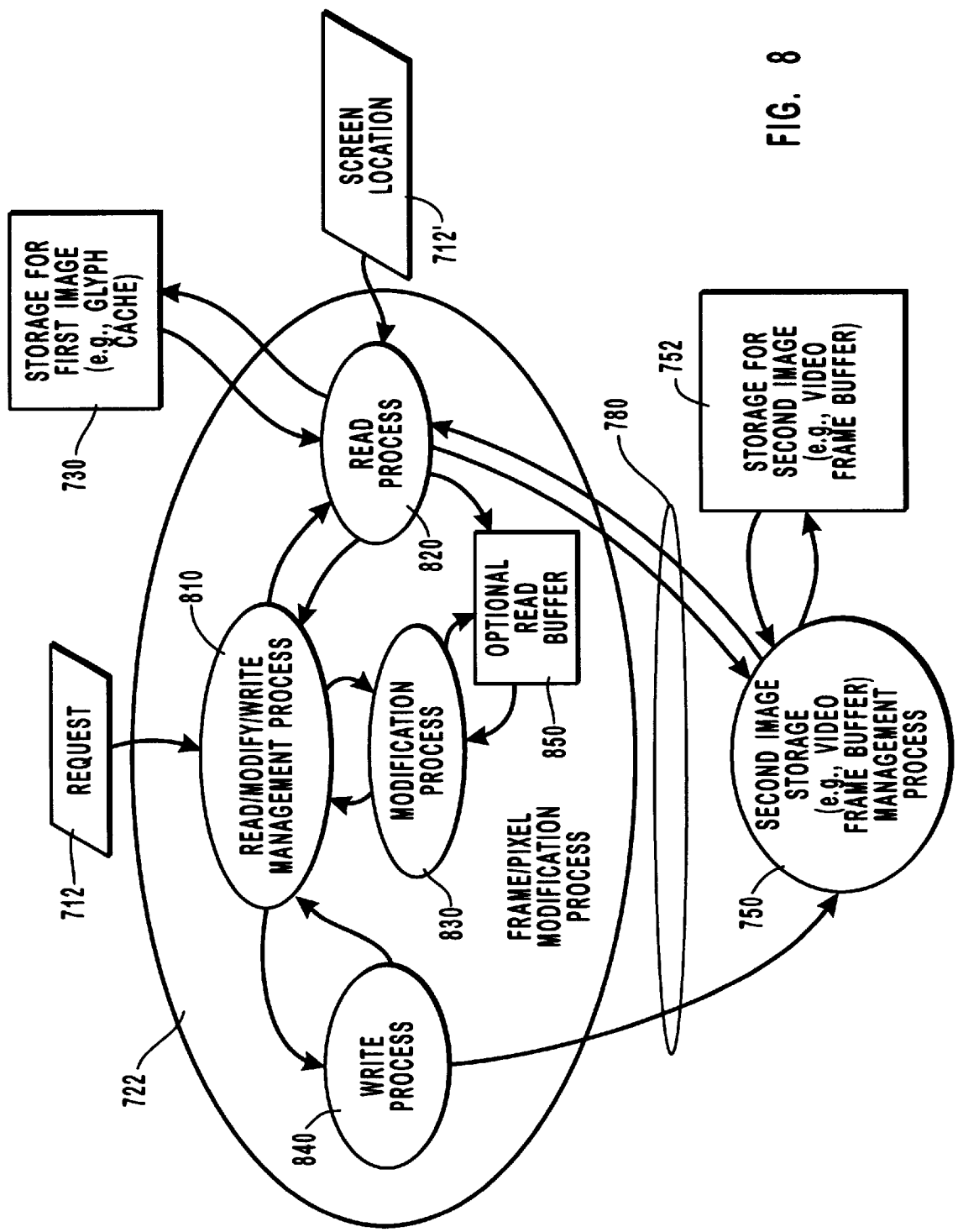
FIG. 8 illustrates processes which may be used to effect a frame or pixel modification process.

FIG. 8 is a more detailed view of processes that may define the frame/pixel modification process 722. A read/modify/write management process (or more generally, a read/modify/write manager) 810 may be used to accept requests and to coordinate the operations of a read process (or more generally, a read facility) 820, a modification process (or more generally, a modification facility) 830 and a write process (or more generally, a write facility) 840. An optional read buffer 850 may be used to store information read by the read process 820 to be used by the modification process 830, as will be described in more detail below. Exemplary methods for effecting each of these processes, or for effecting the frame/pixel modification process 722 in general, are described in § 4.4 below. In general, the read process may be used to read character information from the first storage unit (e.g., glyph cache) 730 and to read information of a second (remote) image, via the second image storage (e.g., video frame buffer) management process 750, from the second storage unit (e.g., video frame buffer) 752. The modification process 830 may be used to blend the first (e.g., character) information with the information of the second (remote) image. The write process may be used to write the modified pixels, and in some cases, foreground pixels of the first (e.g., character) information, to the second image storage (e.g., the video frame buffer) 752, via the second image storage management process 750.

Having described the basic functions of the processes, exemplary methods for effecting these processes are set forth in § 4.4 below.

§ 4.4 Exemplary Methods

Figure 9:
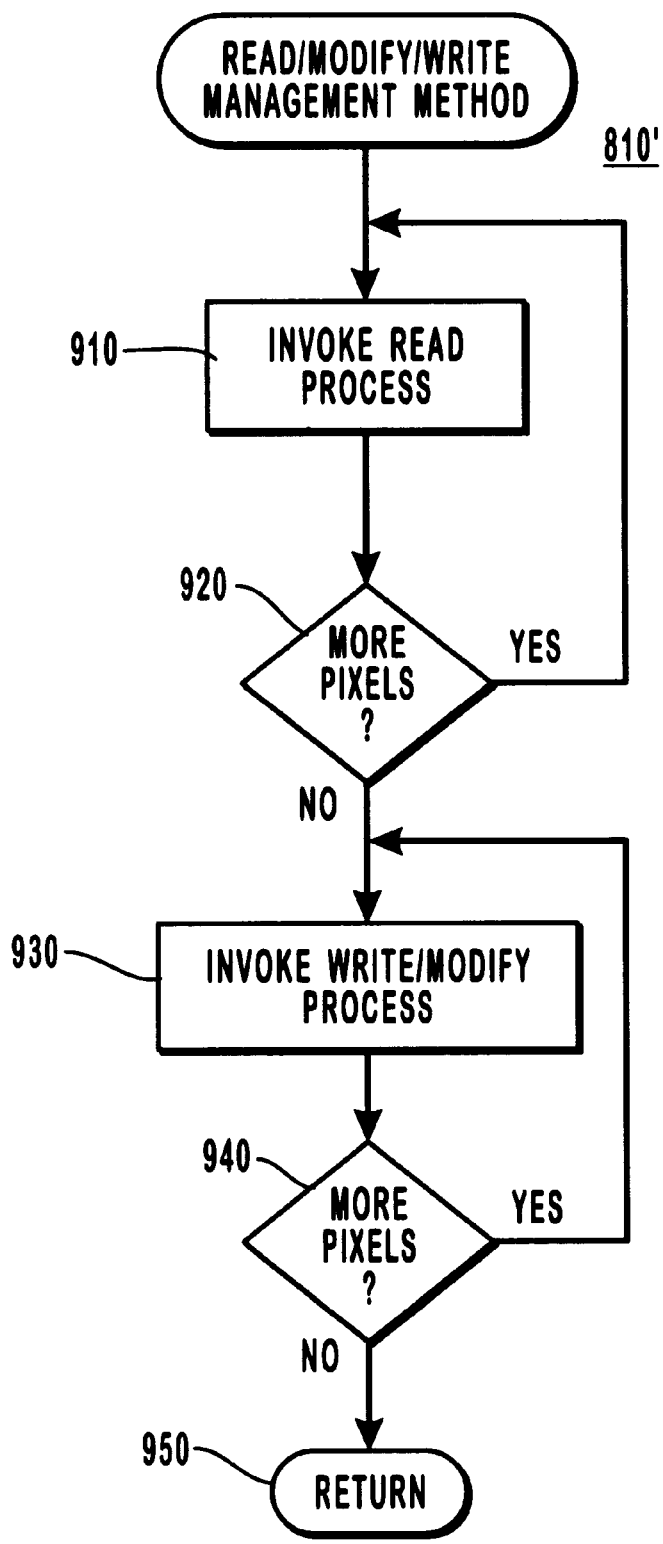
FIG. 9 is a flow diagram of an exemplary method for effecting a read, modify, write management process.

FIG. 9 is a high level flow diagram of an exemplary method 810' for effecting the read/modify/write management process 810. First, a shown in act 910, the read process 820 is invoked. A method for effecting the read process will be described later. Then, at conditional branch point 920, it is determined whether or not there are more pixels to be processed. All pixels of the first (local) image, such as character glyphs for example, may be processed at once. Alternatively, the pixels of the first (local) image may be processed in batches of a predetermined number of pixels. If, on the one hand, there are more pixels to be processed, the method branches back to act 910. If, on the other hand, there are no more pixels to be processed, the method branches to act 930. At act 930, a loop which manages both the modify process 830 and the write process 840 is invoked. Then, at conditional branch point 940, it is determined whether or not there are more pixels, either in the first (local) image, or in the batch of pixels of the first (local) image, to be processed. If so, the method branches back to act 930. Otherwise, the method is left via RETURN node 950.

Figure 10:
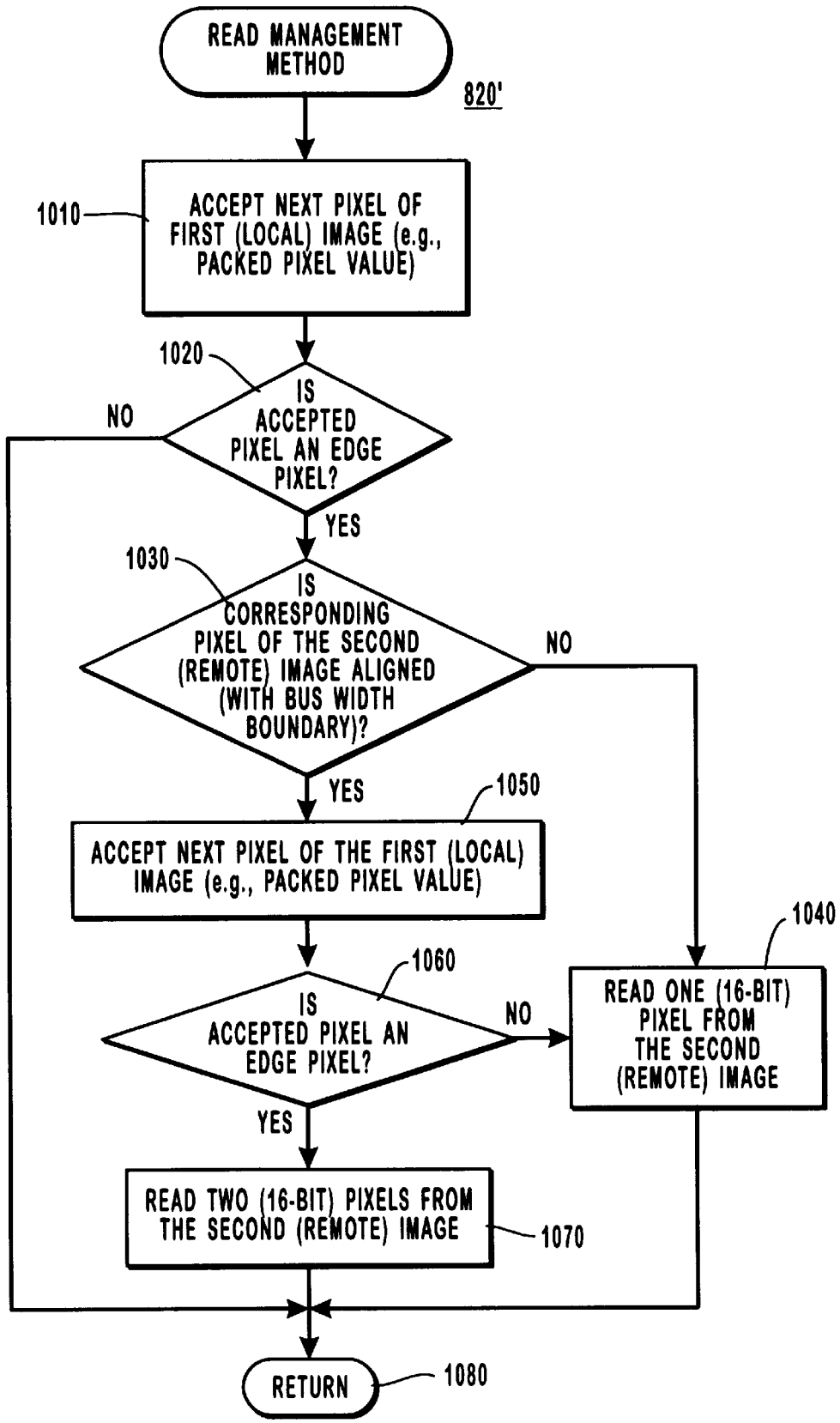
FIG. 10 is a flow diagram of an exemplary method for effecting a read management process in a system having a 32-bit wide bus, and a destination (or "remote") image with 16 bits per pixel and 32-bit boundaries.

Recall that act 910 of the read/modify/write method invoked a read management process 810. FIG. 10 is a high level flow diagram of an exemplary method 820' for effecting the read process 820. Referring now to FIG. 10, a next pixel of the first (local) image (e.g., a glyph) is accepted as shown in act 1010. The pixel may have a blend coefficient (or alpha) value. For example, the blend coefficient may be a value of 0–255. If the blend coefficient is a packed pixel value as described in U.S. patent application Ser. No. 09/273,147 filed on Mar. 19, 1999, the blend coefficient may have a value of 0–179. Next, at conditional branch point 1020, it is determined whether or not the accepted pixel is an "edge" pixel (or more generally, a pixel that is neither transparent nor opaque). This will occur when the blend coefficient is neither at its maximum value (e.g., 179 or 255), nor its minimum value (e.g., 0). That is, an edge pixel is one that is neither 100 percent opaque, nor 100 percent transparent. It should be noted that pixels other than edge pixels may be neither 100 percent opaque, nor 100 percent transparent. However, for convenience, any pixel that is neither 100 percent opaque nor 100 percent transparent may be referred to as an "edge pixel." If, on the one hand, the accepted pixel is not an "edge" pixel, the method 820' is left via RETURN node 1080. This is because if the pixel has a maximum blend coefficient (that is, if it is 100 percent opaque), it will simply overwrite the corresponding pixel of the second (remote) image and if the pixel has a minimum blend coefficient (that is, if it is 100 percent transparent), the corresponding pixel of the second (remote) image will remain unchanged. If, on the other hand, the accepted pixel is an "edge" pixel, processing branches to conditional branch point 1030, at which it is determined whether the corresponding pixel of the second (remote) image (e.g., stored in the video frame buffer) is aligned with a read boundary. If not, as shown in act 1040, the corresponding pixel of the second (remote) image is simply read (e.g., from the video frame buffer) and the method 820' is left via RETURN node 1080. Otherwise, the next pixel of the first (local) image (e.g., a glyph) is accepted as shown in act 1050. Next, at conditional branch point 1060, it is determined whether or not the accepted pixel is an "edge" pixel. If not, the method branches to act 1040, described above. Otherwise, the method branches to act 1070. At act 1070, the two (2) pixels of the second (remote) image are read (e.g., from the video frame buffer) after which the method 820' is left via RETURN node 1080.

Note that steps 1050 and 1060 can be skipped if reading an additional pixel from the video frame buffer does not affect the time of the read. Note also that if the communications link 780 is wider (such as with a 64-bit AGP bus for example), more than two (2) pixels can be read at a time. Generalizing, in acts 1050, 1060 and 1070, up to n/m pixels can be read together, where n is the width of the communications link 780 or the maximum read width supported and m is the number of bits per pixel of the second (remote) image.

Figure 11:
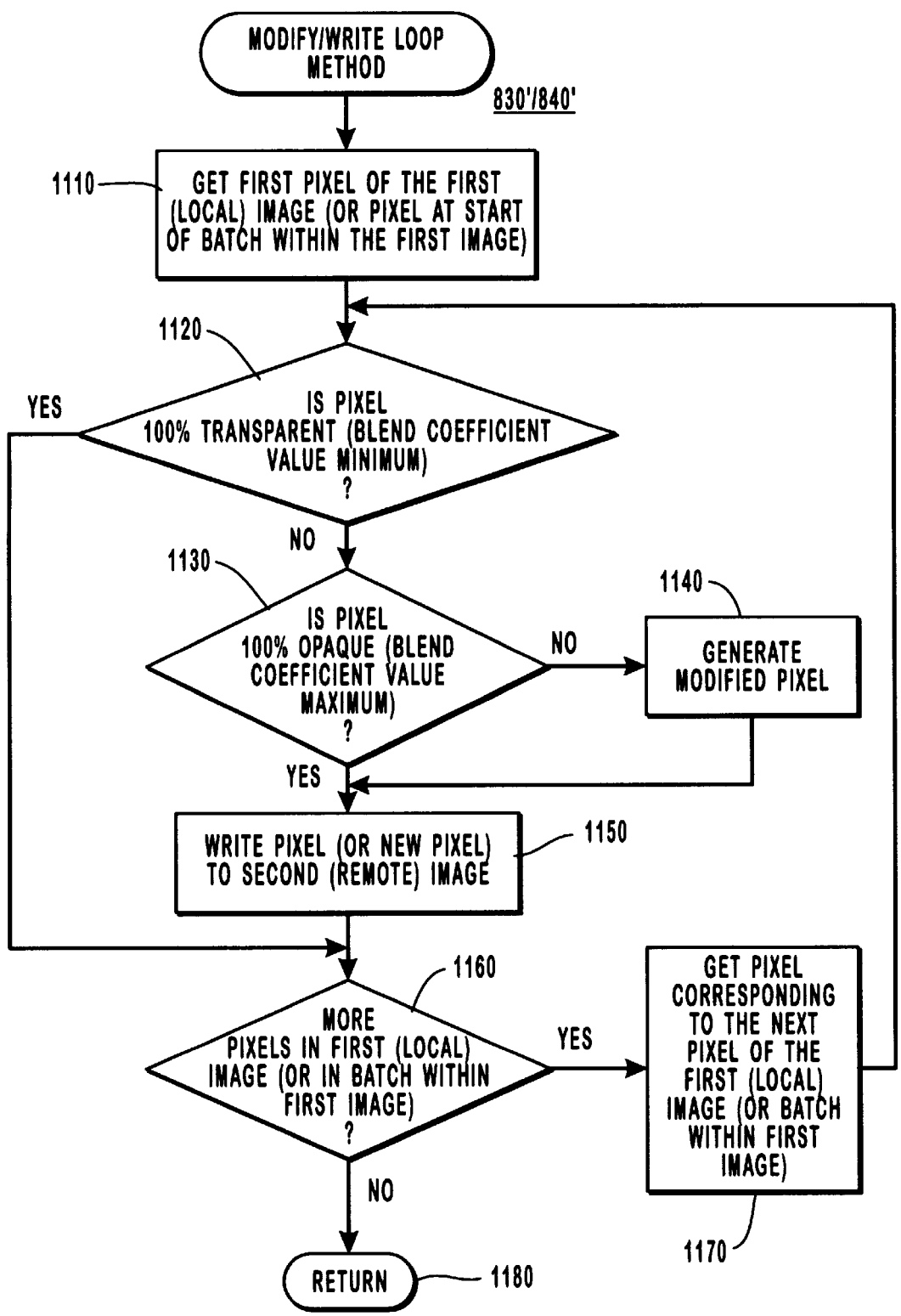
FIG. 11 is a flow diagram of an exemplary method for effecting a modify process and a write process.

FIG. 11 is a high level flow diagram of an exemplary modify/write loop method 830'/840'. At act 1110, the first pixel of the first (local) image (e.g., glyph) is accepted. Then, at conditional branch point 1120, it is determined whether or not the blend coefficient of the accepted pixel has a minimum value (e.g., 0). That is, it is determined whether or not the pixel is 100 percent transparent. If so, the method branches to conditional branch point 1160 described below. Basically, when the blend coefficient is minimum, the background image is to be maintained "as is". Thus, no modify or write steps are needed. If, on the other hand, the blend coefficient of the accepted pixel is not the minimum, the method branches to conditional branch point 1130 where it is determined whether or not the blend coefficient of the accepted pixel has a maximum value (e.g., 179 or 255). That is, it is determined whether or not the pixel is 100 percent opaque. If so, as shown in act 1150, the pixel, with the value of the accepted foreground color 712, 726, is simply written over the corresponding pixel of the second (remote) image. If, on the other hand, the blend coefficient of the accepted pixel is not the maximum, the method branches to act 1140 where a modified pixel is generated. For example, a modified pixel may be generated based on the accepted foreground color, the color of the corresponding pixel of the second (remote) image, and the blend coefficient. For example, if the pixel modification is to be a blend operation, and a blend coefficient (alpha) is normalized to a value of between 0 and 1, the modified pixel may be defined by the following expression:

$$pixel_{new} = pixel_{local} * alpha + pixel_{remote} * (1-alpha).$$

A pixel blend operation, performed on individual pixel sub-components corresponding to different color components is described later referring to FIG. 15. The new pixel is then written to the second (remote) image as shown in act 1150. Once the write 1150 is performed, the method proceeds to conditional branch point 1160. At conditional branch point 1160, it is determined whether or not there are any remaining pixels in the first (local) image (e.g., glyph), or, alternatively, whether or not there are any remaining pixels in the batch of pixels being processed. If not, the method 830'/840' is left via RETURN node 1180. Otherwise, at act 1170, the pixel corresponding to the next position of the first (local) image (e.g., glyph) is retrieved and the method continues to conditional branch point 1120.

FIG. 12, which includes FIGS. 12A and 12B, is a flow diagram of an exemplary method 722' for effecting a read/modify/write process 722. The method 722' performs read and modify operations in batches. At act 1205, the first pixel of the first (or local) bitmap (e.g., a glyph) or the first pixel of a batch within the first (or local) bitmap is retrieved. At conditional branch point 1210, it is determined whether or not the pixel is 100 percent transparent (that is, whether or not the blend coefficient of the source pixel has a minimum value). If so, processing branches to conditional branch point 1245 where it is determined whether or not there are any more pixels in the first (or local) bitmap (e.g., glyph) or within the batch within the first (or local) bitmap. If so, the next pixel of the first (or local) bitmap (e.g., a glyph) or of the batch within the first (or local) bitmap is retrieved as shown in act 1215. If not, processing continues, via node A 1250, to act 1255 described later.

Referring back to conditional branch point 1210, if the pixel is not 100 percent transparent (that is, if the blend coefficient of the pixel does not have a minimum value), then processing branches to conditional branch point 1220. At conditional branch point 1220, it is determined whether or not the pixel is 100 percent opaque (that is, whether or not the blend coefficient of the pixel has a maximum value). If so, the pixel is written to a corresponding location of the second (remote) image (which may be stored in the video frame buffer 752) as shown in act 1225, and processing continues to step 1245, which was discussed above.

Referring back to conditional branch point 1220, if the pixel is not 100 percent opaque (that is, if the blend coefficient of the pixel does not have a maximum value), then the processing branches to act 1230. At act 1230, the aligned address of the corresponding pixel of the second (or remote) image is determined. This may be done by determining the largest address less than or equal to the address of the corresponding pixel of the second (or remote) image that is on an integer multiple of "n", where "n" is the width, in bits, of the bus between the modification process and the storage for the second (or remote) image or the width of a supported read instruction. Next, at conditional branch point 1235, it is determined whether or not a read buffer 850 already contains n-bits at the aligned address of the corresponding pixel of the second (or remote) image (that is, whether the bits have already been read and buffered). If so, the processing branches to conditional branch point 1245 which was described above. Otherwise, the processing branches to act 1240 at which "n" bits are read into the read buffer 850 from the aligned address of the corresponding pixel of the second (or remote) image. Processing then continues to conditional branch point 1245, already described above.

Referring, once again to act 1255, the first pixel of the first (or local) bitmap (e.g., the glyph) or the first pixel of the batch within the first (or local) bitmap is retrieved. Then, at conditional branch point 1260, it is determined whether or not the pixel is 100 percent transparent (that is, whether or not the blend coefficient of the pixel has a minimum value) or 100 percent opaque (that is, whether or not the blend coefficient of the pixel has a maximum value), or neither. If the pixel is either 100 percent transparent or 100 percent opaque it was already handled above. Therefore, the processing branches to conditional branch point 1280 where it is determined whether or not there are any remaining pixels within the first (or local) bitmap (e.g., glyph) or within a batch within the first (or local) bitmap. If not, the method 722' is left via RETURN node 1290. Otherwise, a next pixel of the first (or local) bitmap (e.g., glyph) or the next pixel of the batch within the first (or local) bitmap is retrieved as shown in act 1285 and the processing continues back to conditional branch point 1260. Referring back to conditional branch point 1260, if the pixel is nether 100 percent transparent nor 100 percent opaque, as shown in act 1265, an m-bit (where "m" is the number of bits per pixel (or "bpp") of pixels in the video frame buffer) pixel from the second (or remote) image is extracted from the read buffer 850. (Recall act 1240 above.) Then, as shown in act 1270, the pixel of the first (or local) image is modified (e.g., blended with the corresponding pixel of the second (or remote) image based on the blend coefficient). Next, the resulting pixel is written to the second (or remote) image, which may be stored in the video frame buffer, as shown in act 1275, and processing continues to conditional branch point 1280, already described above.

In FIG. 12 above, notice that 100 percent opaque pixels of the first (or local) image were written to the video frame buffer in a first ("read") loop and modified pixels (that is, pixels of the first (or local) image blended with corresponding pixels of the second (or remote) image) were written to the second (or remote) image, which may be stored in the video frame buffer, in a second ("modify") loop. FIG. 13, which includes FIGS. 13A and 13B, is a flow diagram of an alternative read/modify/write method 722" in which all writes are performed in the second loop, and no writes are performed in the first ("read") loop. At act 1305, the first pixel of the first (or local) image (e.g., a glyph) or the first pixel of a batch within the first (or local) image is retrieved. At conditional branch point 1310, it is determined whether or not the pixel is 100 percent transparent (that is, whether or not the blend coefficient of the source pixel has a minimum value) or 100 percent opaque (that is, whether or not the blend coefficient of the source pixel has a maximum value), or neither. If the pixel is neither 100 percent transparent nor 100 percent opaque, then processing continues to act 1320 at which the aligned address of the corresponding pixel of the second (or remote) image is determined. This may be done by determining the largest address less than or equal to the address of the corresponding pixel of the second (or remote) image that is on an integer multiple of "n", where "n" is the width, in bits, of the bus between the modification process and the destination storage or the width of a supported read instruction. Next, at conditional branch point 1325, it is determined whether or not the read buffer 850 already contains n-bits at the aligned address of the corresponding pixel of the second (or remote) image (that is, whether the bits have already been read). If so, the processing branches to conditional branch point 1335 where it is determined whether or not there are any more pixels in the first (or local) image (e.g., glyph) or within the batch within the first (or local) image. If so, the next pixel of the first (or local) image (e.g., a glyph) or of the batch within the first (or local) image is retrieved as shown in act 1315 and the processing continues to conditional branch point 1310. If not, processing continues, via node A 1340, to act 1345 described later. Referring back to conditional branch point 1325, if it is determined that the read buffer 850 does not already contain n-bits at the aligned address of the corresponding pixel of the second (or remote) image (that is, the bits have not yet been read), the processing branches to act 1330 at which "n" bits are read into the read buffer from the aligned address of the corresponding pixel of the second (or remote) image. Processing then continues to conditional branch point 1335, already described above.

Referring back to conditional branch point 1310, if the pixel is either 100 percent transparent or 100 percent opaque, processing branches to conditional branch point 1335.

Referring, once again to act 1345, the first pixel of the first (or local) image (e.g., the glyph) or the first pixel of the batch within the first (or local) image is retrieved. Then, at conditional branch point 1350, it is determined whether or not the pixel is 100 percent transparent (that is, whether or not the blend coefficient of the pixel has a minimum value). If the pixel is 100 percent transparent, no modifications or writes are needed. Therefore, the processing branches to conditional branch point 1370 where it is determined whether or not there are any remaining pixels within the first (or local) image (e.g., glyph) or within a batch within the first (or local) image. If not, the method 722" is left via RETURN node 1380. Otherwise, a next pixel of the first (or local) image (e.g., glyph) or the next pixel of the batch within the first (or local) image is retrieved as shown in act 1375 and the processing continues back to conditional branch point 1350. Referring back to conditional branch point 1350, if the pixel is not 100 percent transparent, then, as shown in conditional branch point 1355, it is determined whether or not the pixel is 100 percent opaque (that is, whether or not the blend coefficient of the pixel has a maximum value). If not, as shown in act 1360, an m-bit (where "m" is the number of bits per pixel (or "bpp") of pixels in the video frame buffer) pixel from the second (or remote) image is extracted from the n-bit read buffer 850 (Recall act 1240 above) and the pixel of the first (or local) image is modified (e.g., blended with the corresponding pixel of the second (or remote) image based on the blend coefficient). Next, the resulting pixel is written to the second (or remote) image, which may be stored in the video frame buffer, as shown in act 1365. Returning to conditional branch point 1355, if the pixel is 100 percent opaque (that is, if its associated blend coefficient has the maximum value), then the pixel is written to the second (or remote) image, without modification, as shown in act 1365. In any event, from act 1365, processing continues to conditional branch point 1370, already described above.

Notice that in the methods of FIGS. 12 and 13, there were two (2) separate loops. In FIG. 12, in a first loop, pixels of a first (or local) image were read and, if 100 percent opaque, written to a second (or remote) image, which may be stored in a video frame buffer. In a second loop, any read pixels of the first (or local) image that were neither 100 percent opaque nor 100 percent transparent were modified and then written to the second (or remote) image. In FIG. 13, any necessary reads were performed in a first loop and any necessary modifies and writes were performed in a second loop. FIG. 14, which includes FIGS. 14A and 14B, is a flow diagram of an exemplary read/modify/write method 722'" in which read, modify, and write operations may be performed in a single loop through the pixels of the first (or local) image. More specifically, the first pixel of the first (or local) image (e.g., a glyph) is retrieved as shown in act 1405. Next, at conditional branch point 1410, it is determined whether or not the pixel is 100 percent transparent that is, whether or not its blend coefficient has a minimum value). If so, processing branches, via node A 1457, to conditional decision point 1460 to process more pixels, if any. This branching takes place since if a pixel of the first (or local) image is 100 percent transparent, the second (or remote) image remains the same at the associated pixel location. Referring once again to conditional branch point 1410, if the pixel is not 100 percent transparent, processing branches to conditional branch point 1420 at which it is determined whether or not the pixel is 100 percent opaque (that is, whether or not its blend coefficient has a maximum value). If so, then the pixel is simply written to the second (or remote) image as shown in act 1425. This effective overwriting of the corresponding pixel of the second (or remote) image with the pixel of the first (or local) image occurs because the first (or local) image is to be opaque at the current pixel. Then, processing continues, via node A 1457, to conditional branch point 1460 to process more pixels, if any. Referring once again to conditional branch point 1420, if the pixel is not 100 percent opaque, then processing branches to act 1430 at which an aligned address of the corresponding pixel of the second (or remote) image is determined. As was the case in FIGS. 12 and 13 above, an aligned address may be defined as the largest address which is less than or equal to the address of the corresponding pixel of the second (or remote) image and which is an integer multiple of the n-bit bus size or of the width of a supported read instruction. After act 1430, processing continues to conditional branch point 1435, at which it is determined whether or not a read buffer already contains n-bits at the address of the corresponding pixel of the second (or remote) image (i.e., if the corresponding pixel of the second (or remote) image was already read). If so, processing branches to act 1445, discussed below. If not, n-bits are read into the read buffer 850 from the aligned address as indicated in act 1440 and processing continues to act 1445. At act 1445, an m-bit pixel of the second (or remote) image is extracted from the n-bit read buffer 850. Then, at act 1450, the pixel of the first (or local) image is modified (e.g., blended with the pixel of the second (or remote) image). The resulting pixel is then written to the second (or remote) image as shown in act 1455. Processing then continues, via node A 1457, to conditional branch point 1460 at which it is determined whether or not there are more pixels of the first (or local) image (e.g., glyph) pixels to be processed. If not, the method 722''' is left via RETURN node 1465. If, on the other hand, there are more pixels of the first (or local) image to be processed, a next pixel is retrieved as shown in act 1415 and processing continues, via node B 1459, to conditional branch point 1410, which was described above. Note that in the method 722''' of FIG. 14, the read information of the second (remote) image need not be buffered at read buffer 850 since any necessary modification and write operations are performed immediately after each read operation. Thus, steps 1440 and 1445 can be combined into a single step of reading n bits from the aligned address of the second (remote) image.

Acts 1140, 1270, 1360 and 1450 of FIGS. 11, 12, 13 and 14, respectively, each related to modifying a background (or destination) image based on a foreground (or source) image. FIG. 15 is a high level flow diagram of an exemplary blending method 830' which may be used as such modification acts. First, as shown in act 1510, blend coefficients (or alphas) for pixel sub-components are determined based on the pixel's blend coefficient (or alpha). For example, in U.S. patent application Ser. No. 09/273,147, filed on Mar. 19, 1999, during a character scan conversion process, red, green and blue pixel sub-component luminous intensity values may be "packed" into a single 8-bit value which can range from 0 to 179. In that application, six (6) red luminous intensity levels are used, e.g., levels 0–5, ten (10) green luminous intensity levels are used, e.g., levels 0–9, and three (3) blue luminous intensity levels are used, e.g., levels 0–2.

This results in a total of 180 (=6×10×3) possible R, G, and B luminous intensity level combinations. The packed pixel value may be determined based on the following expression:

$$\text{packed pixel} = (10 \times R + G) \times 3 + B.$$

This packed pixel value may be used as a blend coefficient (alpha). Individual blend coefficients corresponding to the individual color components may be "unpacked" by decoding the packed pixel value. That is, normalized red, green and blue intensity values can be determined from the packed pixel value. For example, the color space 0 through 255 may be divided into equal segments based on weighted colors. Thus, for example, if there are five (5) red colors, the color space is divided into five (5) segments, each spaced 255/5 apart. This yields six (6) unique red colors, which are normalized to the color space. Thus, normalized colors can be determined using the following expression:

$$(\text{Total Number of Colors} - \text{Desired Color Index}) \times 255 / \text{Total Number of Colors}$$

Referring back to FIG. 15, in acts 1520 and 1530, the foreground color to be applied to the pixel of the first (or local) image is decomposed into color sub-components, as is the color of the pixel read from the second (or remote) image. Note that the act 1520 of decomposing the foreground color into color sub-components only needs to be done once, and can therefore be done as a part of preprocessing. Then, in each of acts 1542, 1544 and 1546, a color sub-component (e.g., red, green, or blue) of the foreground is blended with the color sub-component of the pixel of the second (or remote) image based on the corresponding alpha sub-component. The method 830' is then left via RETURN node 1550.

Although it has been assumed that the foreground color is constant, varying foreground colors may be used.

In each of the foregoing read/modify/write methods, some conditional branch points determined whether a pixel is "100 percent transparent", "100 percent opaque", "either 100 percent transparent or 100 percent opaque", or "neither 100 percent transparent nor 100 percent opaque". Further recall that 100 percent transparent corresponds to a minimum blend coefficient value, while 100 percent opaque corresponds to a maximum blend coefficient value. However, the present invention covers similar cases where the pixel is approximately 100 percent opaque (or simply "opaque") or approximately 100 percent transparent (or simply "transparent") and that such cases correspond to blend coefficients that have approximately maximum or minimum values, respectively. Pixels that are neither opaque nor transparent may be referred to as "translucent" pixels. The foregoing approximations may be used when the resulting blended image doe not significantly and perceptibly differ from a blended image using the extreme blend coefficient values. Further, it is possible to change the representation of blend coefficients. For example, a minimum blend coefficient value could correspond to 100 percent opaque while a maximum blend coefficient value could correspond to 100 percent transparent.

Having described exemplary methods for effecting the processes of FIG. 7, an example which illustrates the operation of these processes and the communication of data between these processes is provided in § 4.5 below.

§ 4.5 Operation Example of Exemplary Structure

FIG. 16 is a diagram which illustrates the flow of data and information between processes, which may be used to effect at least some aspects of the present invention, during an operation of the present invention. The operation may commence in response to a request 1605, such as a request from an application to blend a first image onto a second image. In this example, the first image is a character(s) having a single color. Thus, the request may include a foreground color. Otherwise, a foreground color may be accepted from elsewhere. The request may also include locations) of the second image to be modified by the first image. Alternatively, the request may include an anchor location of the second image about which pixels are to be modified. The request 1605 may be accepted by frame/pixel modification process 722. In response, the frame/pixel modification process 722 may submit a request 1610 to a read process 820 for reading date of the first image from a storage device 730. The read process 820 may include a process converting locations of the pixels read from the first image to desired pixel coordinates of the second image. In response to a request 1615 for character information, the storage device 730 may return character information 1620. The read process 820 passes the character information, as well as desired locations in the second image, 1625 back to the frame/pixel modification process 722.

As described above, the frame/pixel modification process 722 may then request 1630 relevant information from second image via the second video storage unit (e.g., frame management process 750) which, in turn, passes a request 1635 for the relevant pixels to the second storage unit (e.g., the video frame buffer) 752. As described above, this information will correspond to pixels in the first image that have blend coefficients that are neither maximum (100 percent opaque) nor minimum (100 percent transparent). The second storage unit (e.g., the video frame buffer) 752 may then return the requested pixels to the second image storage management process 750 in communication 1640. The second image storage management process 750 then forwards these pixels (along with their locations) to the frame/pixel modification process 722 in communication 1645.

Having the image information of the first image, such as blend coefficient values for each of the pixels for example, and the relevant pixels of the second image, the frame/pixel modification process 722 may then determine a new, modified, pixel based on the foreground color, the read pixel of the second image, and the blend coefficient. These new, modified, pixels, along with their locations within the image of the second image, may then be forwarded to the second image storage management process 750 in communication 1650. In response, the second image storage management process 750 may write the new, modified, pixels to the second storage unit (e.g., the video frame buffer) 752 in communication 1655.

§ 4.6 Conclusions

In view of the foregoing disclosure, it is clear that the present invention advantageously minimizes relatively expensive read operations and may combine such read operations when possible. Thus, the present invention may be used to improve applications having read/modify/write operations, such as image blend applications.

What is claimed is:

1. In a system for modifying second information based on first information, a method comprising:
    a) reading a part of the first information;
    b) determining, based on the part of the first information, whether or not a corresponding part of the second information needs to be modified;
    c) if it is determined, in act (b), that the corresponding part of the second information needs to be modified, then further determining whether or not the corresponding part of the second information is needed to effect the modification;
    d) if it is determined, in act (c), that the corresponding part of the second information is needed to effect the modification, then
        i) reading the corresponding part of the second information,
        ii) modifying the corresponding part of the second information based on both the first information and the corresponding part of the second information to generate new information, and
        iii) replacing the corresponding part of the second information with the new information; and
    e) if it is determined, in act (c), that the corresponding part of the second information is not needed to effect the modification, then replacing the corresponding part of the second information with information based, at least in part, on the first information.

2. The method of claim 1 wherein the first information is a first image and wherein the second information is a second image.

3. The method of claim 2 wherein the act of modifying the corresponding part of the second information based on both the first information and the corresponding part of the second information to generate new information is a blend operation.

4. The method of claim 3 wherein the first information includes a blend coefficient value.

5. The method of claim 4 wherein the modification act includes decomposing the blend coefficients corresponding to separate color components.

6. The method of claim 5 wherein the modification act further includes
    separating a foreground color into the separate color components,
    separating a pixel of the second image into the separate color components, and
    blending each color component separately based on the corresponding blend coefficient, foreground color component and pixel of the second image color component.

7. The method of claim 1 wherein the part of the first information includes a blend coefficient value, and
    wherein the act of determining, based on the part of the first information, whether or not a corresponding part of the second information needs to be modified, determines that the corresponding part of the second information needs to be modified when the blend coefficient is a non-extreme value and that the corresponding part of the second information does not need to be modified when the blend coefficient is an extreme value corresponding to a transparent foreground.

8. The method of claim 7 wherein the act of further determining whether or not the corresponding part of the second information is needed to effect the modification, determines that the corresponding part of the second information is needed to effect the modification when the blend coefficient value is non-extreme and that the corresponding part of the second information is not needed to effect the modification when the blend coefficient value is an extreme value corresponding to an opaque foreground.

9. The method of claim 1 wherein the act of reading the corresponding part of the second information uses a read operation which starts on aligned read boundaries, and
    wherein, if the corresponding part of the second information does not start on one of the aligned read boundaries, then determining an address aligned with an aligned read boundary that is below an address of the corresponding part of the second information.

10. The method of claim 1 wherein the first information is a first image including pixels and the second information is a second image including pixels,
wherein the corresponding part of the second information is a corresponding pixel of the second image, and
wherein if it is determined, in act (c), that the corresponding part of the second information is needed to effect the modification for two adjacent pixels of the first image, then reading two adjacent pixels of the second image.

11. A medium containing machine readable instructions which, when executed by a machine effect the method of claim 1.

12. In a system for modifying a second image based on a first image, a method comprising:
a) for each pixel of the first image,
  i) determining whether or not the pixel is an edge pixel,
  ii) if it is determined that the pixel is an edge pixel, then
    A) determining whether or not a corresponding pixel of the second image is aligned,
    B) if it is determined that the corresponding pixel of the second image is aligned, then
      1) determining whether a next pixel of the first image is an edge pixel,
      2) if it is determined that the next pixel of the first image is an edge pixel, then reading the pixels of the second image corresponding to the pixel and the next pixel of the first image, and
      3) if it is determined that the next pixel of the first image is not an edge pixel, then reading the pixel of the second image corresponding to the pixel of the first image, and
    C) if it is determined that the corresponding pixel of the second image is not aligned, then reading the pixel of the second image corresponding to the pixel of the first image, and
  iii) if it is determined that the pixel is not an edge pixel, then continuing to act (a)(i); and
b) for each pixel of the first image, determining whether or not the pixel is transparent and if not,
  i) determining whether or not the pixel is opaque,
  ii) if it is determined that the pixel is not opaque, modifying the pixel based, in part, on a corresponding pixel of the second image to generate a modified pixel, and writing the modified pixel to a location of the corresponding pixel, and
  iii) if it is determined that the pixel is opaque, then writing the pixel to the location of the corresponding pixel.

13. The method of claim 12 wherein a pixel is determined to be an edge pixel when it is neither opaque, nor transparent.

14. The method of claim 12 wherein each pixel of the second image has 16 bits and
wherein reads of the second image are aligned every 32 bits.

15. The method of claim 12 wherein each pixel of the first image has a corresponding blend coefficient, and
wherein, when the blend coefficient is approximately maximum, the pixel is opaque and when the blend coefficient is approximately minimum, the pixel is transparent.

16. The method of claim 15 wherein the modification act includes decomposing the blend coefficients corresponding to separate color components.

17. The method of claim 16 wherein the modification act further includes
separating a foreground color into the separate color components,
separating a pixel of the second image into the separate color components, and
blending each color component separately based on the corresponding blend coefficient, foreground color component and pixel of the second image color component.

18. A medium containing machine readable instructions which, when executed by a machine effect the method of claim 12.

19. In a system for modifying a second image based on a first image, a method comprising:
a) for each pixel of the first image,
  i) determining whether or not the pixel is transparent,
  ii) if it is determined that the pixel is not transparent, then
    A) determining whether or not the pixel is opaque,
    B) if it is determined that the pixel is 100 percent opaque, then writing the pixel over a corresponding pixel of the second image, and
    C) if it is determined that the pixel is not opaque, then
      1) determining an aligned address of the second image based on a location of a pixel of the second image corresponding to the pixel,
      2) determining whether or not a read buffer already contains n bits at the aligned address,
      3) if it is determined that the read buffer does not already contain n bits at the aligned address, reading n bits into the read buffer from the aligned address of the second image; and
b) for each pixel of the first image,
  i) determining whether the pixel is transparent or opaque, or neither,
  ii) if it is determined that the pixel is neither transparent nor opaque, then
    A) extracting an m-bit pixel of the second image from the read buffer,
    B) modifying the pixel based on the m-bit pixel to generate a modified pixel, and
    C) writing the modified pixel to the second image.

20. The method of claim 19 wherein the modified pixel is written to the second address at a location corresponding to that of the m-bit pixel read from the read buffer.

21. The method of claim 19 wherein n is an integer corresponding to a supported read width, and
wherein m is an integer corresponding to the number of bits per pixel in the second image.

22. The method of claim 13 wherein the aligned address is determined by determining the largest address less than or equal to the address of the corresponding pixel of the second image that is an integer multiple of n, where n is the width of a supported read instruction.

23. The method of claim 19 wherein each pixel of the first image has a corresponding blend coefficient, and
wherein, when the blend coefficient is approximately maximum, the pixel is opaque and when the blend coefficient is approximately minimum, the pixel is transparent.

24. The method of claim 23 wherein the modification act includes decomposing the blend coefficients corresponding to separate color components.

25. The method of claim 24 wherein the modification act further includes
separating a foreground color into the separate color components, separating a pixel of the second image into the separate color components, and blending each color component separately based on the corresponding blend coefficient, foreground color component and pixel of the second image color component.

26. A medium containing machine readable instructions which, when executed by a machine effect the method of claim 19.

27. In a system for modifying a second image based on a first image, a method comprising:
a) for each pixel of the first image,
   i) determining whether the pixel is transparent or opaque, or neither,
   ii) if it is determined that the pixel is neither transparent nor opaque, then
      A) determining an aligned address of the second image based on a location of a pixel of the second image corresponding to the pixel,
      B) determining whether or not a read buffer already contains n bits at the aligned address, and
      C) if it is determined that the read buffer does not already contain n bits at the aligned address, reading n bits into the read buffer from the aligned address of the second image; and
b) for each pixel of the first image,
   i) determining whether or not the pixel is transparent,
   ii) if it is determined that the pixel is transparent, then
      A) determining whether or not the pixel is opaque,
      B) if it is determined that the pixel is not opaque, then
         1) generating a modified pixel based on a corresponding pixel of the second image, and
         2) writing the modified pixel to a location of the corresponding pixel of the second image, and
   ii) if it is determined that the pixel is opaque, then writing the pixel to a location of a corresponding pixel of the second image.

28. The method of claim 27 wherein the modified pixel is written to the second address at a location corresponding to that of the m-bit pixel read from the read buffer.

29. The method of claim 27 wherein n is an integer corresponding to a supported read width, and wherein m is an integer corresponding to the number of bits per pixel in the second image.

30. The method of claim 27 wherein the aligned address is determined by determining the largest address less than or equal to the address of the corresponding pixel of the second image that is an integer multiple of n, where n is the width of a supported read instruction.

31. The method of claim 27 wherein each pixel of the first image has a corresponding blend coefficient, and wherein, when the blend coefficient is approximately maximum, the pixel is opaque and when the blend coefficient is approximately minimum, the pixel is transparent.

32. The method of claim 31 wherein the modification act includes decomposing the blend coefficients corresponding to separate color components.

33. The method of claim 32 wherein the modification act further includes separating a foreground color into the separate color components, separating a pixel of the second image into the separate color components, and blending each color component separately based on the corresponding blend coefficient, foreground color component and pixel of the second image color component.

34. A medium containing machine readable instructions which, when executed by a machine effect the method of claim 27.

35. In a system for modifying a second image based on a first image, a method comprising:
a) for each pixel of the first image,
   i) determining whether the pixel is transparent, and
   ii) if it is determined that the pixel is not transparent, then
      A) determining whether or not the pixel is opaque,
      B) if it is determined that the pixel is opaque, then writing the pixel over a corresponding pixel of the second image, and
      C) if it is determined that the pixel is not opaque, then
         1) determining an aligned address of the second image based on a location of a pixel of the second image corresponding to the pixel,
         2) reading n bits from the aligned address of the second image,
         3) modifying the pixel based on m-bit pixel data from the read n bits to generate a modified pixel, and
         4) writing the modified pixel over the corresponding pixel of the second image.

36. The method of claim 35 wherein n is an integer corresponding to a supported read width, and wherein m is an integer corresponding to the number of bits per pixel in the second image.

37. The method of claim 35 wherein the aligned address is determined by determining the largest address less than or equal to the address of the corresponding pixel of the second image that is an integer multiple of n, where n is the width of a supported read instruction.

38. The method of claim 35 wherein each pixel of the first image has a corresponding blend coefficient, and wherein, when the blend coefficient is approximately maximum, the pixel is opaque and when the blend coefficient is approximately minimum, the pixel is transparent.

39. The method of claim 38 wherein the modification act includes decomposing the blend coefficients corresponding to separate color components.

40. The method of claim 39 wherein the modification act further includes separating a foreground color into the separate color components, separating a pixel of the second image into the separate color components, and blending each color component separately based on the corresponding blend coefficient, foreground color component and pixel of the second image color component.

41. A medium containing machine readable instructions which, when executed by a machine effect the method of claim 35.

42. Apparatus for blending a first image and a second image, the apparatus comprising:
a) a first storage unit for storing the first image, the first image including pixels, each of the pixels having a blend coefficient;
b) a blend facility;
c) a second image storage unit for storing the second image, the second image including pixels;
d) a first communications path coupling the first storage unit and the blend facility; and e) a second communications path coupling the second storage unit with the blend facility, wherein the blend facility can write data, via the second communications path, to the second image storage faster than it can read data, via the second communications path, from the second image storage, wherein, if, based on the blend coefficient, a pixel of the first image is opaque, then the blend facility writes the pixel over a corresponding pixel of the second image stored in the second storage unit, and wherein, if, based on the blend coefficient, a pixel of the first image is translucent, then the blend facility reads the corresponding pixel of the second image from the second storage unit, modifies it based on the blend coefficient of the pixel of the first image, and writes the modified pixel back to a location of the second storage unit of the corresponding pixel of the second image.

43. The apparatus of claim 42, wherein, if, based on the blend coefficient, a pixel is translucent, then the blend facility modifies the corresponding pixel of the second image based on the blend coefficient and a foreground color.

44. The apparatus of claim 42, wherein if, based on the blend coefficient, a pixel is translucent, then the blend facility determines whether a next pixel of the first image is translucent, and if so, reads the corresponding two pixels of the second image from the second storage unit in a single read operation.

45. The apparatus of claim 42 wherein the second communications path is selected from a group consisting of a PCI bus and an AGP bus.

46. The apparatus of claim 42 wherein the second storage unit is situated on a display card.

47. The apparatus of claim 42 wherein the blend facility is part of a graphics display interface.

48. The apparatus of claim 47 wherein the graphics display interface is part of a computer operating system.

* * * * *

UNITED STATES PATENT AND TRADEMARK OFFICE
CERTIFICATE OF CORRECTION

PATENT NO. : 6,226,017 B1
DATED : May 1, 2001
INVENTOR(S) : J. Andrew Goossen and Andrew C. Godfrey It is certified that error appears in the above-identified patent and that said Letters Patent is hereby corrected as shown below:

Column 2,
Line 48, change "h elpers.htm" to -- helpers.htm --

Column 9,
Line 17, change "7561" to -- 756 --

Column 17,
Line 7, change "locations)" to -- location(s) --

Signed and Sealed this

Ninth Day of April, 2002

*Attest:*

*Attesting Officer*

JAMES E. ROGAN
*Director of the United States Patent and Trademark Office*